(12) United States Patent
Masuda et al.

(10) Patent No.: US 10,798,308 B2
(45) Date of Patent: Oct. 6, 2020

(54) IMAGING CONTROL DEVICE, IMAGING APPARATUS, IMAGING CONTROL METHOD, AND IMAGING CONTROL PROGRAM

(71) Applicant: FUJIFILM Corporation, Tokyo (JP)

(72) Inventors: Tomonori Masuda, Saitama (JP); Hitoshi Sakurabu, Saitama (JP); Ryo Hasegawa, Saitama (JP); Makoto Kobayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/810,814

(22) Filed: Mar. 5, 2020

(65) Prior Publication Data

US 2020/0204719 A1    Jun. 25, 2020

Related U.S. Application Data

(63) Continuation of application No. PCT/JP2018/022890, filed on Jun. 15, 2018.

(30) Foreign Application Priority Data

Sep. 8, 2017 (JP) .................................. 2017-173371

(51) Int. Cl.
*H04N 5/235* (2006.01)
*G08B 5/36* (2006.01)

(52) U.S. Cl.
CPC ............ *H04N 5/2352* (2013.01); *G08B 5/36* (2013.01)

(58) Field of Classification Search
CPC .. G03B 15/05; G03B 2215/0557; G03B 7/16; H04N 5/225; H04N 5/2256;
(Continued)

(56) References Cited

U.S. PATENT DOCUMENTS

2014/0022368 A1* 1/2014 Olsen ................... H04N 5/2352
348/76
2014/0232903 A1* 8/2014 Oshima ................ H04B 10/541
348/229.1
(Continued)

FOREIGN PATENT DOCUMENTS

JP          2005134711          5/2005
JP          2010134045          6/2010
(Continued)

OTHER PUBLICATIONS

"International Search Report (Form PCT/ISA/210) of PCT/JP2018/022890," dated Jul. 31, 2018, with English translation thereof, pp. 1-5.

(Continued)

*Primary Examiner* — Amy R Hsu
(74) *Attorney, Agent, or Firm* — JCIPRNET

(57) ABSTRACT

An processor that performs consecutive imaging control for consecutively imaging a subject by an imaging sensor and emitting auxiliary light in an imaging period in which each of the plurality of times of the imaging is performed, the imaging periods do not overlap, an end timing of a light emission period of the auxiliary light started in the imaging period is later than an end timing of the imaging period, the imaging control device further controls a light emission intensity of the auxiliary light in the light emission period started in the second imaging period or imaging sensitivity in the second imaging period based on the light emission intensity of the auxiliary light emitted in an overlapping period overlapping with the second imaging period in the light emission period started in the first imaging period.

20 Claims, 14 Drawing Sheets

(58) Field of Classification Search
CPC .......... H04N 5/23203; H04N 5/23206; H04N 5/2351; H04N 5/2354; H04N 5/238; H04N 7/18; H04N 7/183; H05B 47/105; H05B 47/11
See application file for complete search history.

(56) References Cited

U.S. PATENT DOCUMENTS

| | | | | |
|---|---|---|---|---|
| 2014/0240495 | A1* | 8/2014 | Shinya | H04N 5/2352 348/143 |
| 2017/0104910 | A1* | 4/2017 | Kimura | H04N 5/35563 |
| 2017/0231062 | A1* | 8/2017 | Nagata | H04N 5/225 |
| 2018/0343725 | A1* | 11/2018 | Nagata | H04N 5/225 |
| 2019/0253606 | A1* | 8/2019 | Nagata | H04N 7/183 |

FOREIGN PATENT DOCUMENTS

| | | |
|---|---|---|
| JP | 2016058995 | 4/2016 |
| WO | 2016031359 | 3/2016 |

OTHER PUBLICATIONS

"Written Opinion of the International Searching Authority (Form PCT/ISA/237) of PCT/JP2018/022890," dated Jul. 31, 2018, with English translation thereof, pp. 1-6.

\* cited by examiner

FIG. 1
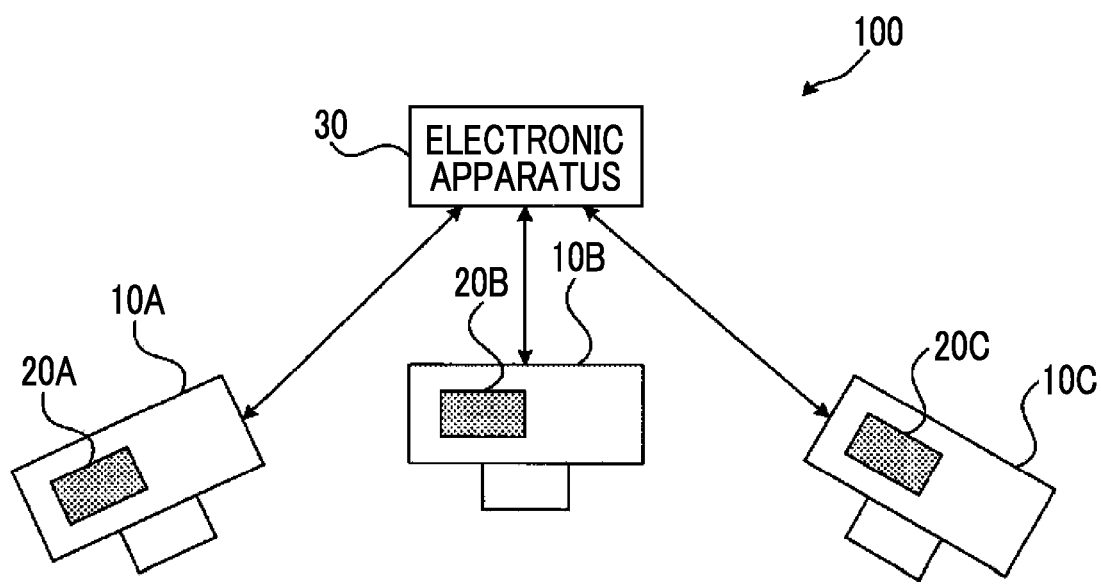
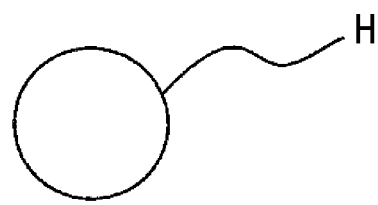

FIG. 9

| | IMAGING PERIOD TS1 LIGHT EMISSION PERIOD FL1 | IMAGING PERIOD TS2 LIGHT EMISSION PERIOD FL2 | IMAGING PERIOD TS3 LIGHT EMISSION PERIOD FL3 |
|---|---|---|---|
| LIGHT EMISSION INTENSITY RECEIVED FROM ADJACENT LIGHT EMISSION PERIOD | 0 | $0.1 \times Q1$ | $0.02 \times Q1$ |
| LIGHT RECEPTION INTENSITY OF IMAGING ELEMENT IN IMAGING PERIOD | $0.9 \times Q1$ (TARGET VALUE) | $Q2a = 0.8 \times Q1$ | $Q3a = 0.88 \times Q1$ |
| LIGHT EMISSION INTENSITY OF AUXILIARY LIGHT IN LIGHT EMISSION PERIOD | $Q1$ | $Q2 = 0.82 \times Q1$ | $Q3 = 0.93 \times Q1$ |

FIG. 11

| | IMAGING PERIOD TS1 LIGHT EMISSION PERIOD FL1 | IMAGING PERIOD TS2 LIGHT EMISSION PERIOD FL2 | IMAGING PERIOD TS3 LIGHT EMISSION PERIOD FL3 |
|---|---|---|---|
| LIGHT EMISSION INTENSITY RECEIVED FROM ADJACENT LIGHT EMISSION PERIOD | 0 | $0.1 \times Q1$ | $0.1 \times Q1$ |
| LIGHT RECEPTION INTENSITY OF IMAGING ELEMENT IN IMAGING PERIOD | $0.9 \times Q1$ (TARGET VALUE) | $0.9 \times Q1$ (TARGET VALUE) | $0.9 \times Q1$ (TARGET VALUE) |
| LIGHT EMISSION INTENSITY OF AUXILIARY LIGHT IN LIGHT EMISSION PERIOD | $Q1$ | $Q1$ | $Q1$ |
| IMAGING SENSITIVITY IN IMAGING PERIOD | SET VALUE | SET VALUE $\times$ 0.9 | SET VALUE $\times$ 0.9 |

IMAGING CONTROL DEVICE, IMAGING APPARATUS, IMAGING CONTROL METHOD, AND IMAGING CONTROL PROGRAM

CROSS REFERENCE TO RELATED APPLICATIONS

This application is a Continuation of PCT International Application No. PCT/JP2018/022890 filed on Jun. 15, 2018, which claims priority under 35 U.S.C § 119(a) to Patent Application No. 2017-173371 filed in Japan on Sep. 8, 2017, all of which are hereby expressly incorporated by reference into the present application.

BACKGROUND OF THE INVENTION

1. Field of the Invention

The present invention relates to an imaging control device, an imaging apparatus, an imaging control method, and a non-transitory computer recording medium storing an imaging control program.

2. Description of the Related Art

In order to image a moving subject such as an animal or an insect, the subject is imaged by a plurality of imaging apparatuses.

For example, WO2016/031359A discloses a system that consecutively images a subject by a plurality of imaging apparatuses including light emission devices. In this system, at the time of imaging by each imaging apparatus, a light emission period of each light emission device is controlled not to overlap such that auxiliary light from the light emission device mounted in another imaging apparatus does not interfere.

JP2016-058995A discloses a system that images a subject at the same time by a plurality of imaging apparatuses including light emission devices. In this system, each imaging apparatus micro-adjusts a light emission condition of the light emission device of the imaging apparatus or an exposure condition of the imaging apparatus based on the light emission condition and the like of the light emission device of another imaging apparatus, thereby preventing auxiliary light from the light emission device mounted in the other imaging apparatus from affecting exposure.

In the system disclosed in JP2016-058995A, in a case where appropriate exposure cannot be implemented even after the micro-adjustment of the light emission condition or the exposure condition is repeated, the auxiliary light from the light emission device of the other imaging apparatus is prevented from affecting the exposure by shifting the timings of imaging by the plurality of imaging apparatuses.

SUMMARY OF THE INVENTION

In a case where the subject is consecutively imaged by the plurality of imaging apparatuses and the auxiliary light is emitted at the time of each imaging, the light emission period of the auxiliary light emitted at the time of certain imaging may overlap with a period of the subsequent imaging in a case where an exposure time at the time of each imaging is short and an interval of the imaging is short. Thus, each imaging is not performed with appropriate exposure.

The system disclosed in WO2016/031359A controls the light emission period of the auxiliary light not to overlap with the exposure time at the time of the subsequent imaging. In addition, in the disclosure of JP2016-058995A, in a case where imaging is consecutively performed by the plurality of imaging apparatuses, the light emission period of the auxiliary light is controlled not to overlap with the exposure time at the time of the subsequent imaging.

However, in a case where each of the exposure time at the time of each imaging and the interval of the imaging is significantly short, the control for non-overlapping between the light emission period of the auxiliary light and the exposure time may not be performed. Such a case is not considered in WO2016/031359A and JP2016-058995A.

The present invention is conceived in view of the above matter. An object of the present invention is to provide an imaging control device capable of appropriately setting brightness of a captured image obtained in each imaging even in a case where a subject is consecutively imaged at a high speed in a short time, an imaging apparatus including the imaging control apparatus, an imaging control method, and a non-transitory computer recording medium storing an imaging control program.

An imaging control device of the present invention comprises an imaging control unit that performs consecutive imaging control for consecutively imaging a subject a plurality of times by an imaging element and emitting auxiliary light from a light emission device in an imaging period in which each of the plurality of times of the imaging is performed. The imaging periods of the plurality of times do not overlap. An end timing of a light emission period of the auxiliary light started in the imaging period is later than an end timing of the imaging period. The imaging period that precedes between the two imaging periods adjacent in time series is set as a first imaging period, and the imaging period that succeeds between the two imaging periods is set as a second imaging period. The imaging control device further includes an imaging condition control unit that controls a light emission intensity of the auxiliary light in the light emission period started in the second imaging period or imaging sensitivity in the second imaging period based on the light emission intensity of the auxiliary light emitted in an overlapping period overlapping with the second imaging period in the light emission period started in the first imaging period.

An imaging apparatus of the present invention comprises the imaging control device.

An imaging control method of the present invention comprises an imaging control step of performing consecutive imaging control for consecutively imaging a subject a plurality of times by an imaging element and emitting auxiliary light from a light emission device in an imaging period in which each of the plurality of times of the imaging is performed. The imaging periods of the plurality of times do not overlap. An end timing of a light emission period of the auxiliary light started in the imaging period is later than an end timing of the imaging period. The imaging period that precedes between the two imaging periods adjacent in time series is set as a first imaging period, and the imaging period that succeeds between the two imaging periods is set as a second imaging period. The imaging control method further includes an imaging condition control step of controlling a light emission intensity of the auxiliary light in the light emission period started in the second imaging period or imaging sensitivity in the second imaging period based on the light emission intensity of the auxiliary light emitted in an overlapping period overlapping with the second imaging period in the light emission period started in the first imaging period.

A non-transitory computer recording medium storing a imaging control program of the present invention causes a computer to execute an imaging control step and an imaging condition control step. The imaging control step is a step of performing consecutive imaging control for consecutively imaging a subject a plurality of times by an imaging element and emitting auxiliary light from a light emission device in an imaging period in which each of the plurality of times of the imaging is performed. The imaging periods of the plurality of times do not overlap. An end timing of a light emission period of the auxiliary light started in the imaging period is later than an end timing of the imaging period. The imaging period that precedes between the two imaging periods adjacent in time series is set as a first imaging period, and the imaging period that succeeds between the two imaging periods is set as a second imaging period. The imaging condition control step is a step of controlling a light emission intensity of the auxiliary light in the light emission period started in the second imaging period or imaging sensitivity in the second imaging period based on the light emission intensity of the auxiliary light emitted in an overlapping period overlapping with the second imaging period in the light emission period started in the first imaging period.

According to an embodiment of the present invention, an imaging control device capable of appropriately setting brightness of a captured image obtained in each imaging even in a case where a subject is consecutively imaged at a high speed in a short time, an imaging apparatus including the imaging control apparatus, an imaging control method, and an imaging control program can be provided.

BRIEF DESCRIPTION OF THE DRAWINGS

FIG. 1 is a diagram illustrating a schematic configuration of an imaging system 100 for consecutively imaging a subject H a plurality of times.

FIG. 9 is a diagram for describing one example of a method of adjusting a light emission intensity of auxiliary light in step S6 illustrated in FIG. 7.

FIG. 11 is a diagram for describing one example of a method of adjusting imaging sensitivity in step S6a illustrated in FIG. 10.

DESCRIPTION OF THE PREFERRED EMBODIMENTS

Hereinafter, an embodiment of the present invention will be described with reference to the drawings.

FIG. 1 is a diagram illustrating a schematic configuration of an imaging system 100 for consecutively imaging a subject H a plurality of times.

The imaging system 100 comprises an imaging apparatus 10A including a light emission device 20A that emits auxiliary light, an imaging apparatus 10B including a light emission device 20B that emits auxiliary light, an imaging apparatus 10C including a light emission device 20C that emits auxiliary light, and an electronic apparatus 30.

The imaging apparatus 10A, the imaging apparatus 10B, and the imaging apparatus 10C are installed at different locations in a state where an optical axis of an imaging lens of each of the imaging apparatus 10A, the imaging apparatus 10B, and the imaging apparatus 10C is directed toward the subject H.

Each of the imaging apparatus 10A, the imaging apparatus 10B, and the imaging apparatus 10C is an electronic apparatus having an imaging function like a digital camera or a smartphone.

The electronic apparatus 30 is an electronic apparatus such as a smartphone, a tablet terminal, or a personal computer.

The imaging system 100 consecutively images the subject H such as an insect a plurality of times while emitting the auxiliary light. Based on an instruction from the electronic apparatus 30, the imaging apparatus 10A, the imaging apparatus 10B, and the imaging apparatus 10C sequentially image the subject H. That is, based on the instruction, the subject H is consecutively imaged three times.

In an imaging period of the subject H for the imaging apparatus 10A, the light emission device 20A emits the auxiliary light. In the imaging period of the subject H for the imaging apparatus 10B, the light emission device 20B emits the auxiliary light. In the imaging period of the subject H for the imaging apparatus 10C, the light emission device 20C emits the auxiliary light. Accordingly, exposure at the time of each imaging is appropriately controlled.

Figure 2:
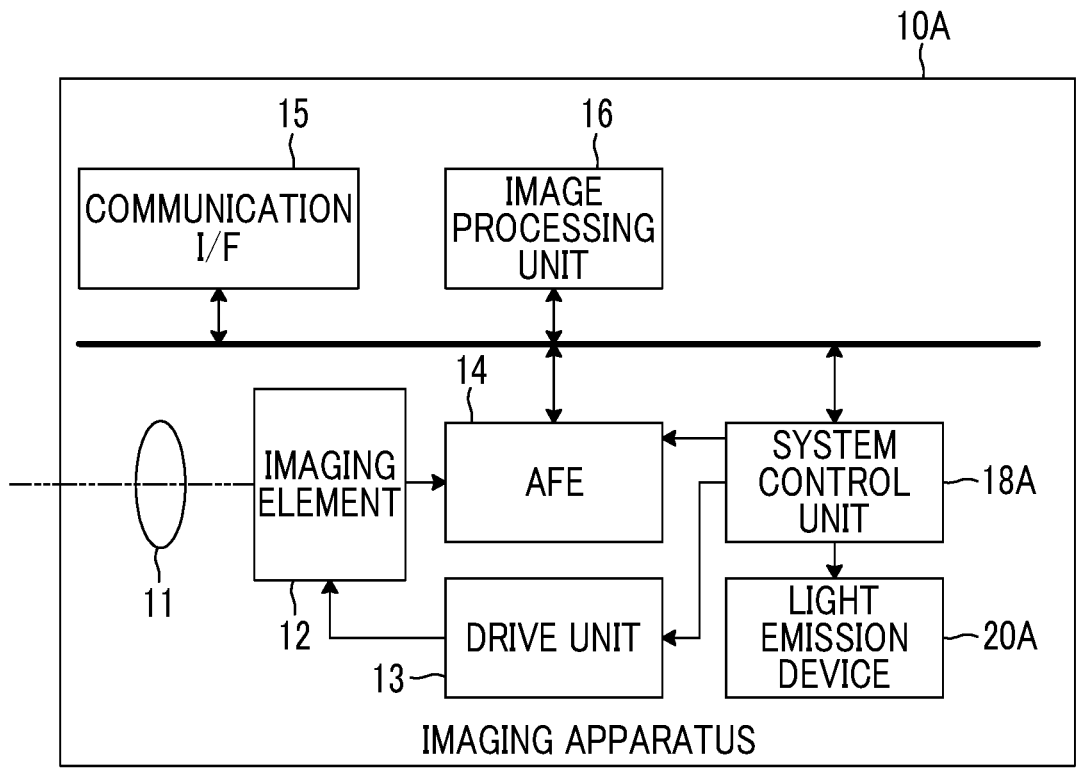
FIG. 2 is a diagram illustrating an internal configuration of an imaging apparatus 10A in the imaging system 100 illustrated in FIG. 1.

FIG. 2 is a diagram illustrating an internal configuration of the imaging apparatus 10A in the imaging system 100 illustrated in FIG. 1.

The imaging apparatus 10A comprises an imaging optical system 11 including an imaging lens, an imaging element (imaging sensor) 12 that images the subject through the imaging optical system 11, a drive unit 13 that drives the imaging element 12, an analog front end (AFE) 14 including a signal processing circuit that processes an imaging signal output from the imaging element 12, a communication interface (I/F) 15 for communicating with an external apparatus including the electronic apparatus 30, an image processing unit 16 that generates captured image data by performing digital signal processing on the imaging signal processed in the AFE 14, the light emission device (flash) 20A that emits the auxiliary light from a semiconductor light source or the like such as a xenon light source or a light emitting diode (LED), and a system control unit 18A that manages and controls the entire imaging apparatus 10A.

The imaging element 12 includes an imaging surface on which a plurality of pixels including photoelectric conversion elements are two-dimensionally arranged. The imaging element 12 is an imaging element that supports a so-called global shutter and can image the subject by starting exposure in all pixels at the same time and ending the exposure at the same time.

The AFE 14 includes an amplification circuit that amplifies the imaging signal by multiplying the imaging signal output from the pixels of the imaging element 12 by a gain, and a conversion circuit that converts the imaging signal after the amplification into a digital signal. Imaging sensitivity (so-called ISO sensitivity) at the time of imaging by the imaging element 12 is determined by the gain set in the amplification circuit.

The system control unit 18A drives the imaging element 12 through the drive unit 13 and causes the imaging element 12 to image the subject.

In the present embodiment, the "imaging" means that the exposure of all pixels on the imaging surface of the imaging element 12 is started at the same time, and the exposure is ended at the same time in all pixels after an elapse of a predetermined time. A period in which the imaging is performed by the imaging element 12 (a period in which the exposure of the pixels is performed) is referred to as an imaging period, and the length of the imaging period is referred to as an exposure time.

The system control unit 18A emits the auxiliary light from the light emission device 20A in the imaging period of the subject H for the imaging element 12. The system control unit 18A sets a start timing of the imaging period to match a start timing of the light emission period of the auxiliary light for the light emission device 20A.

The light emission period of the auxiliary light for the light emission device 20A is a period in which a sufficient intensity of the auxiliary light is emitted from the light emission device 20A, and specifically, refers to a period in which a light emission intensity of the auxiliary light is greater than a predetermined threshold value.

The system control unit 18A controls the length of the imaging period of the subject H for the imaging element 12, a gain (imaging sensitivity) of the amplification circuit of the AFE 14, the length of the light emission period of the auxiliary light for the light emission device 20A, and the light emission intensity of the auxiliary light during the light emission period based on first setting information that is transmitted from the electronic apparatus 30 and is received in the communication I/F 15.

The first setting information includes information of the exposure time which is the length of the imaging period in which the imaging is performed by the imaging element 12 of the imaging apparatus 10A, the imaging sensitivity in the imaging, a light emission time that is the length of the light emission period of the auxiliary light started during the imaging period, and the light emission intensity of the auxiliary light in the light emission period.

Figure 3:
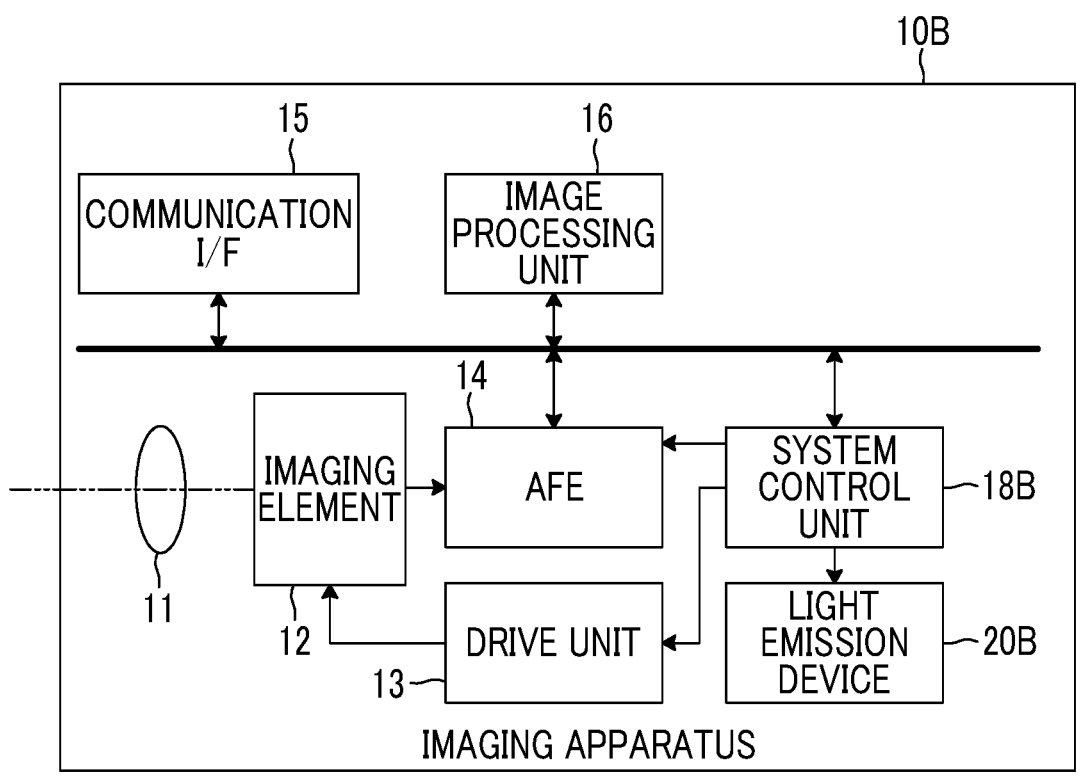
FIG. 3 is a diagram illustrating an internal configuration of an imaging apparatus 10B in the imaging system 100 illustrated in FIG. 1.

FIG. 3 is a diagram illustrating an internal configuration of the imaging apparatus 10B in the imaging system 100 illustrated in FIG. 1.

The imaging apparatus 10B has the same configuration as the imaging apparatus 10A except that the system control unit 18A is changed to a system control unit 18B and the light emission device 20A is changed to the light emission device 20B.

The light emission device 20B has the same configuration as the light emission device 20A and emits the auxiliary light based on an instruction from the system control unit 18B.

The system control unit 18B drives the imaging element 12 through the drive unit 13 and causes the imaging element 12 to image the subject H.

The system control unit 18B emits the auxiliary light from the light emission device 20B in the imaging period of the subject H for the imaging element 12. The system control unit 18B sets the start timing of the imaging period to match the start timing of the light emission period of the auxiliary light for the light emission device 20B.

The light emission period of the auxiliary light for the light emission device 20B is a period in which a sufficient intensity of the auxiliary light is emitted from the light emission device 20B, and specifically, refers to a period in which the light emission intensity of the auxiliary light is greater than the above threshold value.

The system control unit 18B controls the length of the imaging period of the subject H for the imaging element 12, the gain (imaging sensitivity) of the amplification circuit of the AFE 14, the length of the light emission period of the auxiliary light for the light emission device 20B, and the light emission intensity of the auxiliary light during the light emission period based on second setting information that is transmitted from the electronic apparatus 30 and is received in the communication I/F 15.

The second setting information includes information of the exposure time which is the length of the imaging period in which the imaging is performed by the imaging element 12 of the imaging apparatus 10B, the imaging sensitivity in the imaging, the light emission time that is the length of the light emission period of the auxiliary light started during the imaging period, and the light emission intensity of the auxiliary light in the light emission period.

Figure 4:
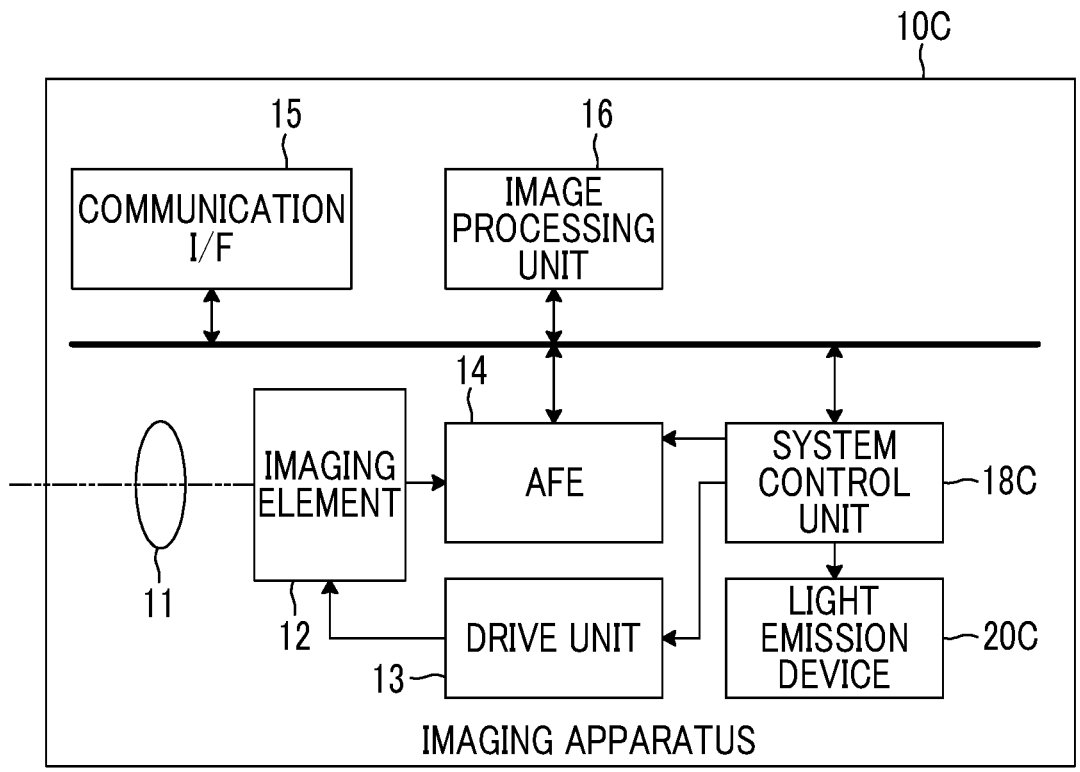
FIG. 4 is a diagram illustrating an internal configuration of an imaging apparatus 10C in the imaging system 100 illustrated in FIG. 1.

FIG. 4 is a diagram illustrating an internal configuration of the imaging apparatus 10C in the imaging system 100 illustrated in FIG. 1.

The imaging apparatus 10C has the same configuration as the imaging apparatus 10A except that the system control unit 18A is changed to a system control unit 18C and the light emission device 20A is changed to the light emission device 20C.

The light emission device 20C has the same configuration as the light emission device 20A and emits the auxiliary light based on an instruction from the system control unit 18C.

The system control unit 18C drives the imaging element 12 through the drive unit 13 and causes the imaging element 12 to image the subject H.

The system control unit 18C emits the auxiliary light from the light emission device 20C in the imaging period of the subject H for the imaging element 12. The system control unit 18C sets the start timing of the imaging period to match the start timing of the light emission period of the auxiliary light for the light emission device 20C.

The light emission period of the auxiliary light for the light emission device 20C is a period in which a sufficient intensity of the auxiliary light is emitted from the light emission device 20C, and specifically, refers to a period in which the light emission intensity of the auxiliary light is greater than the above threshold value.

The system control unit 18C controls the length of the imaging period of the subject H for the imaging element 12, the gain (imaging sensitivity) of the amplification circuit of the AFE 14, the length of the light emission period of the auxiliary light for the light emission device 20C, and the light emission intensity of the auxiliary light during the light emission period based on third setting information that is transmitted from the electronic apparatus 30 and is received in the communication I/F 15.

The third setting information includes information of the exposure time which is the length of the imaging period in which the imaging is performed by the imaging element 12 of the imaging apparatus 10C, the imaging sensitivity in the imaging, the light emission time that is the length of the light emission period of the auxiliary light started during the imaging period, and the light emission intensity of the auxiliary light in the light emission period.

Information of the exposure time included in each of the first setting information, the second setting information, and the third setting information is set to the same value. In addition, information of the imaging sensitivity included in each of the first setting information, the second setting information, and the third setting information is set to the same value. In addition, information of the light emission time included in each of the first setting information, the second setting information, and the third setting information is set to the same value.

Figure 5:
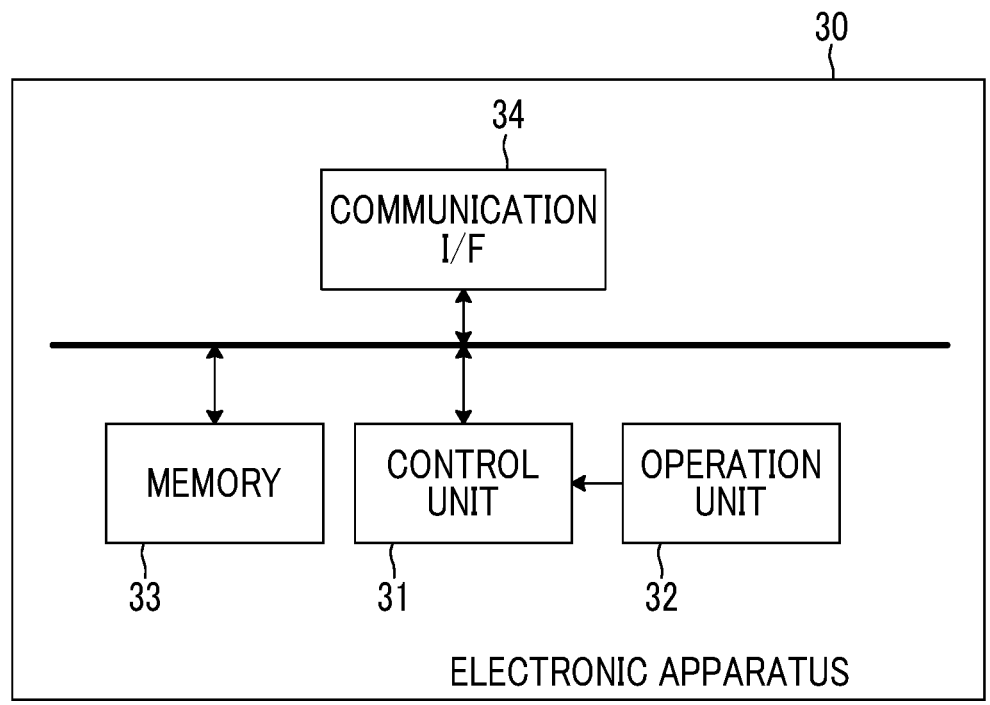
FIG. 5 is a diagram illustrating an internal configuration of an electronic apparatus 30 in the imaging system 100 illustrated in FIG. 1.

FIG. 5 is a diagram illustrating an internal configuration of the electronic apparatus 30 in the imaging system 100 illustrated in FIG. 1.

The electronic apparatus 30 comprises a control unit 31 that manages and controls the entire electronic apparatus 30, an operation unit 32, a memory 33, and a communication interface (I/F) 34.

The control unit 31 manages and controls the entire imaging system 100. A hardware structure of the control unit 31 includes various processors that perform processes by executing programs including an imaging control program.

A hardware structure of each of the system control unit 18A illustrated in FIG. 2, the system control unit 18B illustrated in FIG. 3, and the system control unit 18C illustrated in FIG. 4 also includes various processors.

The various processors include a central processing unit (CPU) that is a general-purpose processor performing various processes by executing a program, a programmable logic device (PLD) that is a processor of which a circuit configuration can be changed after manufacturing like a field programmable gate array (FPGA), or a dedicated electric circuit that is a processor having a circuit configuration dedicatedly designed to execute a specific process like an application specific integrated circuit (ASIC).

More specifically, a structure of the various processors is an electric circuit in which circuit elements such as semiconductor elements are combined.

The control unit 31 may be configured with one of the various processors or may be configured with a combination of two or more processors of the same type or different types (for example, a combination of a plurality of FPGAs or a combination of a CPU and an FPGA).

The operation unit 32 is an interface for inputting various information into the control unit 31 and is configured with a touch panel integrated with a display device, a physical button, or the like.

The memory 33 includes a random access memory (RAM) as a work memory of the control unit 31, a read only memory (ROM) in which programs and the like executed by the control unit 31 are recorded, and the like.

The communication I/F 34 is an interface for communicating with the communication I/F 15 of each of the imaging apparatus 10A, the imaging apparatus 10B, and the imaging apparatus 10C.

Figure 6:
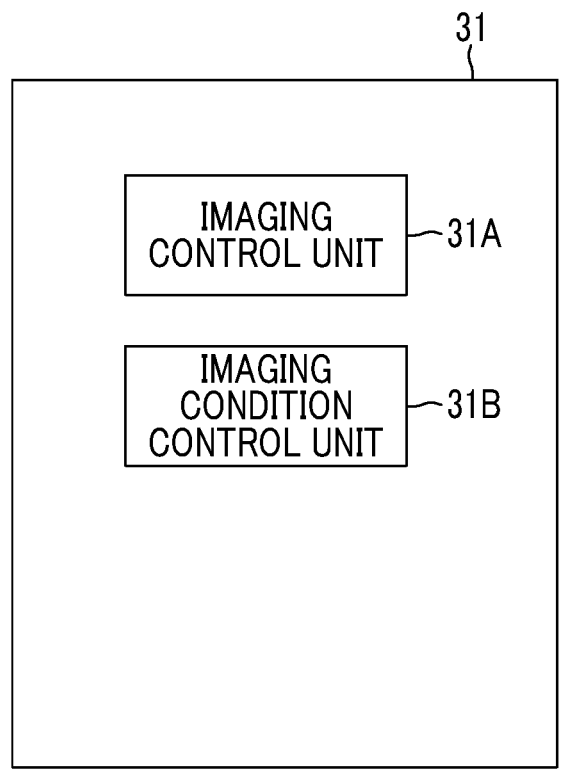
FIG. 6 is a function block diagram of a control unit 31 of the electronic apparatus 30 illustrated in FIG. 5.

FIG. 6 is a function block diagram of the control unit 31 of the electronic apparatus 30 illustrated in FIG. 5.

As illustrated in FIG. 6, by executing the programs stored in the ROM of the memory 33 including the imaging control program, the control unit 31 functions as an imaging control device that comprises an imaging control unit 31A and an imaging condition control unit 31B.

The imaging control unit 31A causes the imaging element 12 of the imaging apparatus 10A, the imaging element 12 of the imaging apparatus 10B, and the imaging element 12 of the imaging apparatus 10C to sequentially image the subject H.

In addition, the imaging control unit 31A emits the auxiliary light from the light emission device 20A in the imaging period of the subject H for the imaging element 12 of the imaging apparatus 10A, emits the auxiliary light from the light emission device 20B in the imaging period of the subject H for the imaging element 12 of the imaging apparatus 10B, and emits the auxiliary light from the light emission device 20C in the imaging period of the subject H for the imaging element 12 of the imaging apparatus 10C.

Specifically, in a state where the first setting information is transmitted to the imaging apparatus 10A, the second setting information is transmitted to the imaging apparatus 10B, and the third setting information is transmitted to the imaging apparatus 10C, the imaging control unit 331A transmits an instruction signal for an instruction to perform the imaging and start the light emission to the imaging apparatus 10A, the imaging apparatus 10B, and the imaging apparatus 10C in this order at intervals.

The system control unit 18A of the imaging apparatus 10A receiving the instruction signal starts the imaging period of the subject H for the imaging element 12. The system control unit 18A controls the length of the imaging period to be equal to the exposure time included in the first setting information.

In addition, the system control unit 18A receiving the instruction signal starts the light emission of the auxiliary light by the light emission device 20A at the same time as the start of the imaging period. The system control unit 18A controls the light emission time of the auxiliary light to be equal to the light emission time included in the first setting information.

Furthermore, by adjusting electric power input into the light emission device 20A, the system control unit 18A controls the light emission intensity of the auxiliary light emitted from the light emission device 20A in the light emission period of the auxiliary light to be equal to the light emission intensity included in the first setting information.

The system control unit 18B of the imaging apparatus 10B receiving the instruction signal starts the imaging period of the subject H for the imaging element 12. The system control unit 18B controls the length of the imaging period to be equal to the exposure time included in the second setting information.

In addition, the system control unit 18B receiving the instruction signal starts the light emission of the auxiliary light by the light emission device 20B at the same time as the start of the imaging period. The system control unit 18B controls the light emission time of the auxiliary light to be equal to the light emission time included in the second setting information.

Furthermore, by adjusting electric power input into the light emission device 20B, the system control unit 18B controls the light emission intensity of the auxiliary light emitted from the light emission device 20B in the light emission period of the auxiliary light to be equal to the light emission intensity included in the second setting information.

The system control unit 18C of the imaging apparatus 10C receiving the instruction signal starts the imaging period of the subject H for the imaging element 12. The system control unit 18C controls the length of the imaging period to be equal to the exposure time included in the third setting information.

In addition, the system control unit 18C receiving the instruction signal starts the light emission of the auxiliary light by the light emission device 20C at the same time as the start of the imaging period. The system control unit 18C controls the light emission time of the auxiliary light to be equal to the light emission time included in the third setting information.

Furthermore, by adjusting electric power input into the light emission device 20C, the system control unit 18C controls the light emission intensity of the auxiliary light emitted from the light emission device 20C in the light emission period of the auxiliary light to be equal to the light emission intensity included in the third setting information.

The interval of the transmission of the instruction signal corresponds to an interval between three consecutive imaging periods of the imaging apparatus 10A, the imaging apparatus 10B, and the imaging apparatus 10C in this order (hereinafter, referred to as an interval of consecutive imaging). The interval of the consecutive imaging may be a predetermined fixed value or may be a value that is set from a user through the operation unit 32.

The imaging condition control unit 31B sets the interval of the consecutive imaging and the exposure time, the light emission time, the light emission intensity of the auxiliary light, and the imaging sensitivity included in the first setting information, the second setting information, and the third setting information as an imaging condition at the time of the consecutive imaging.

Figure 7:
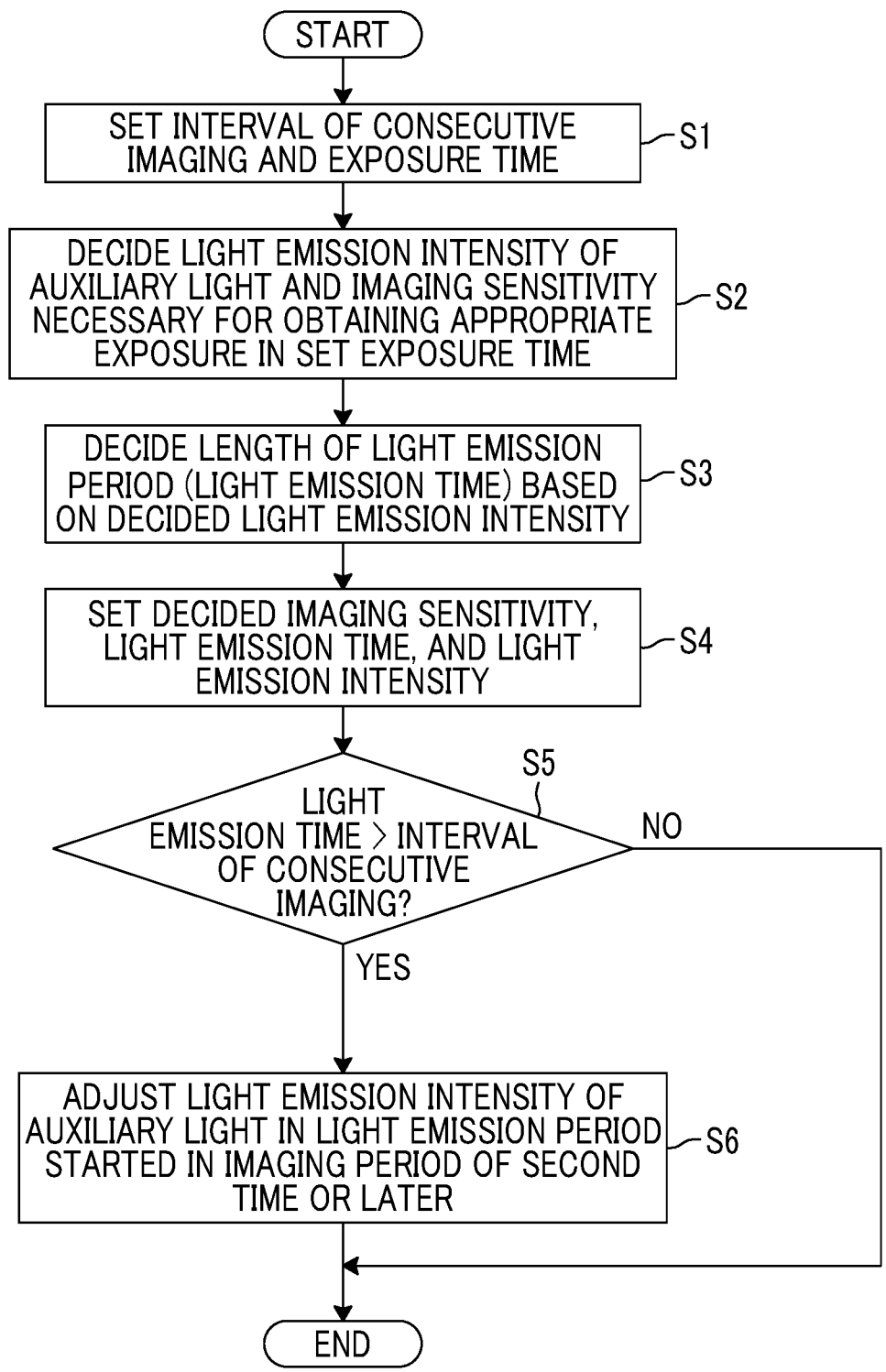
FIG. 7 is a flowchart for describing a setting operation of an imaging condition performed by an imaging condition control unit 31B illustrated in FIG. 6.

FIG. 7 is a flowchart for describing a setting operation of the imaging condition performed by the imaging condition control unit 31B illustrated in FIG. 6.

First, the imaging condition control unit 31B sets the interval of the consecutive imaging and the exposure time included in each of the first setting information, the second setting information, and the third setting information to predetermined fixed values or values that are designated from the user through the operation unit 32 (step S1).

Next, the imaging condition control unit 31B decides, in each imaging period of the consecutive imaging, the light emission intensity of the auxiliary light and the imaging sensitivity necessary for obtaining appropriate exposure in the exposure time set in step S1 (step S2).

Next, based on the light emission intensity decided in step S2, the imaging condition control unit 31B decides the length of the light emission period (light emission time) of the auxiliary light necessary for obtaining the light emission intensity (step S3).

Output characteristics of the auxiliary light of the light emission devices 20A, 20B, and 20C are known. Thus, in a case where the light emission intensity is known, the light emission time necessary for implementing the light emission intensity can be obtained.

Next, the imaging condition control unit 31B sets the imaging sensitivity, the light emission intensity, and the light emission time decided in step S2 and step S3 as information of the imaging sensitivity, the light emission intensity, and the light emission time included in each of the first setting information, the second setting information, and the third setting information (step S4).

Next, the imaging condition control unit 31B determines whether or not the light emission time decided in step S3 is longer than the interval of the consecutive imaging set in step S1 (step S5).

In a case where the light emission time decided in step S3 is longer than the interval of the consecutive imaging set in step S1, the imaging period of the second time or later among the three consecutive imaging periods has a period that overlaps with the light emission period of the auxiliary light started in the imaging period immediately before the imaging period of the second time or later.

Figure 8:
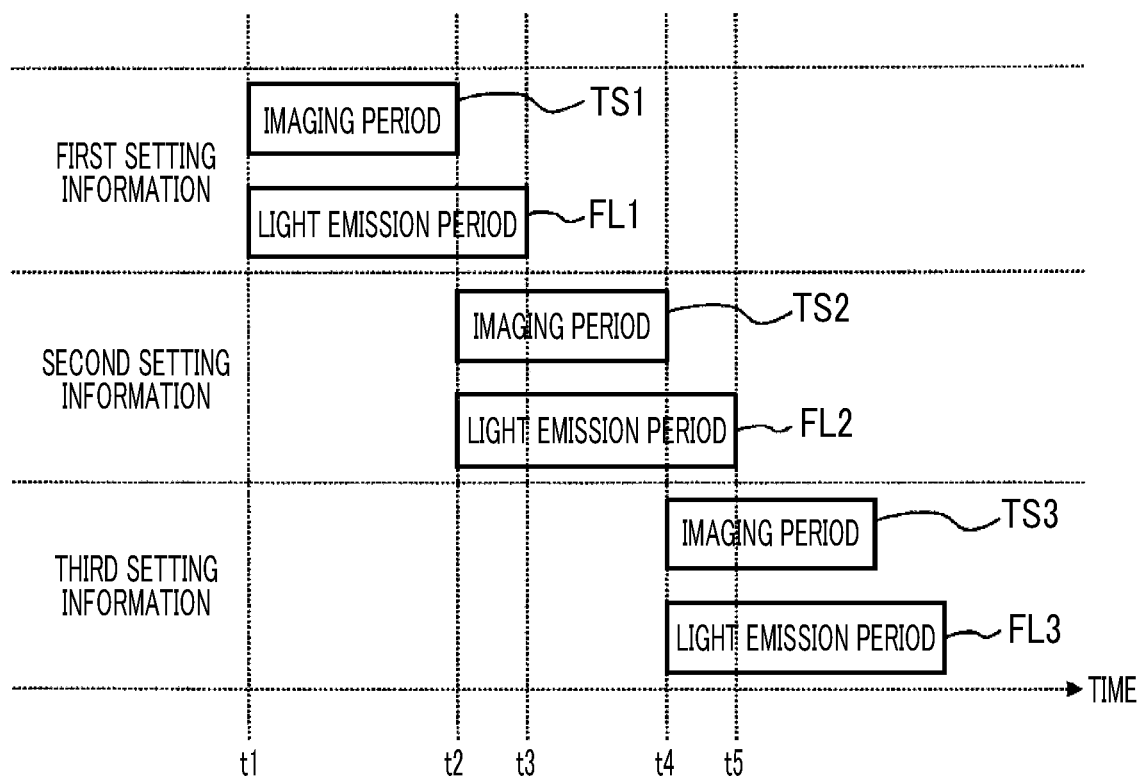
FIG. 8 is a timing chart illustrating an operation example of consecutive imaging based on first setting information, second setting information, and third setting information at a time after a process of step S4 illustrated in FIG. 7.

FIG. 8 is a timing chart illustrating an operation example of the consecutive imaging based on the first setting information, the second setting information, and the third setting information at a time after the process of step S4 illustrated in FIG. 7.

Next to the "first setting information" illustrated in FIG. 8, an imaging period TS1 of the subject H for the imaging apparatus 10A and a light emission period FL1 of the auxiliary light of the light emission device 20A started at the same time as the start of the imaging period TS1 are illustrated as an operation of the imaging apparatus 10A performed based on the first setting information.

Next to the "second setting information" illustrated in FIG. 8, an imaging period TS2 of the subject H for the imaging apparatus 10B and a light emission period FL2 of the auxiliary light of the light emission device 20B started at the same time as the start of the imaging period TS2 are illustrated as an operation of the imaging apparatus 10B performed based on the second setting information.

Next to the "third setting information" illustrated in FIG. 8, an imaging period TS3 of the subject H for the imaging apparatus 10C and a light emission period FL3 of the auxiliary light of the light emission device 20C started at the same time as the start of the imaging period TS3 are illustrated as an operation of the imaging apparatus 10C performed based on the third setting information.

The length of each of the imaging periods TS1, TS2, and TS3 illustrated in FIG. 8 is equal to the exposure time set in step S1.

The length of each of the light emission periods FL1, FL2, and FL3 illustrated in FIG. 8 is equal to the light emission time decided in step S3.

A time between the imaging period TS1 and the imaging period TS2 (a time between time t1 and time t2) and a time between the imaging period TS2 and the imaging period TS3 (a time between time t2 and time t4) illustrated in FIG. 8 correspond to the interval of the consecutive imaging and are equal to the value set in step S1.

In the example illustrated in FIG. 8, the time of the light emission period FL1 is longer than an interval between the imaging period TS1 and the imaging period TS2, and the time of the light emission period FL2 is longer than an interval between the imaging period TS2 and the imaging period TS3.

In FIG. 8, in a case where an imaging period that precedes between two imaging periods adjacent in time series is referred to as a first imaging period and an imaging period that succeeds between the two imaging periods is referred to as a second imaging period, the light emission period started in the first imaging period has an overlapping period that overlaps with the second imaging period.

For example, the light emission period FL1 has an overlapping period (a period between time t2 and time t3) that overlaps with the imaging period TS2. In addition, the light emission period FL2 has an overlapping period (a period between time t4 and time t5) that overlaps with the imaging period TS3.

In a case where the light emission time is longer than the interval of the consecutive imaging and the overlapping period occurs (step S5: YES), the imaging condition control unit 31B adjusts each of the light emission intensity of the auxiliary light in the light emission period FL2 (information of the light emission intensity in the second setting information) and the light emission intensity of the auxiliary light in the light emission period FL3 (information of the light emission intensity in the third setting information) illustrated in FIG. 8 based on the light emission intensity of the auxiliary light emitted in the overlapping period (step S6), and ends the setting operation after the adjustment.

In a case where the light emission time is less than or equal to the interval of the consecutive imaging and the overlapping period does not occur (step S5: NO), the imaging condition control unit 31B ends the setting operation.

FIG. 9 is a diagram for describing one example of a method of adjusting the light emission intensity of the auxiliary light in step S6 illustrated in FIG. 7.

The imaging condition control unit 31B sets a target value to be a light intensity that is a part of the light emission intensity of the auxiliary light in the light emission period FL1 started in the initial imaging period TS1 of the three imaging periods illustrated in FIG. 8 and is received by the imaging element 12 of the imaging apparatus 10A in the imaging period TS1.

For example, as illustrated in FIG. 9, the light emission intensity of the auxiliary light emitted in the light emission period FL1 is denoted by "Q1", and it is assumed that appropriate exposure is obtained in the imaging period TS1 by causing the imaging element 12 of the imaging apparatus 10A to receive 90% of the light emission intensity in the imaging period TS1. In this example, the target value is "0.9×Q1".

In this example, as illustrated in FIG. 9, 10% of the light emission intensity "Q1" of the auxiliary light ("0.1×Q1") in the light emission period FL1 is the light emission intensity of the auxiliary light emitted in the overlapping period with the imaging period TS2.

The percentage of the light emission intensity "Q1" of the auxiliary light received by the imaging element 12 of the imaging apparatus 10A in the imaging period TS1 can be obtained using the length of the imaging period TS1, the length of the light emission period FL1, and the output characteristics of the light emission device 20A.

In addition, the light emission intensity of the auxiliary light that is a part of the light emission intensity "Q1" of the auxiliary light and is emitted in the overlapping period with the imaging period TS2 can be obtained using the length of the overlapping period and the output characteristics of the light emission device 20A.

The length of the overlapping period can be obtained from a difference between the interval of the consecutive imaging set in step S1 in FIG. 7 and the light emission time decided in step S3 in FIG. 7.

In the operation example of the setting of the imaging condition illustrated in FIG. 7, the imaging condition control unit 31B decides the light emission time by the processes of step S2 and step S3. Alternatively, the light emission time can be set as a predetermined fixed value or a value manually set by the user.

The imaging condition control unit 31B sets a light emission intensity "Q2" of the auxiliary light in the light emission period FL2 started in the imaging period TS2 to a value that satisfies a condition that a total value of a light intensity "Q2a" which is a part of the light emission intensity "Q2" and is received by the imaging element 12 of the imaging apparatus 10B in the imaging period TS2 and the light emission intensity (="0.1×Q1") of the auxiliary light emitted in the overlapping period in the light emission period FL1 matches the target value (="0.9×Q1").

That is, the imaging condition control unit 31B decides the light emission intensity "Q2" of the auxiliary light in the light emission period FL2 such that the light intensity "Q2a" is equal to "0.8×Q1". In the example in FIG. 9, the light emission intensity "Q2" is set as "0.82×Q1".

Similarly, the imaging condition control unit 31B sets a light emission intensity "Q3" of the auxiliary light of the light emission period FL3 started in the imaging period TS3 to a value that satisfies a condition that a total value of a light intensity "Q3a" which is a part of the light emission intensity "Q3" and is received by the imaging element 12 of the imaging apparatus 10C in the imaging period TS3 and the light emission intensity (="Q2"−"Q2a"=0.02×Q1) of the auxiliary light emitted in the overlapping period with the imaging period TS3 in the light emission period FL2 matches the target value (="0.9×Q1").

That is, the imaging condition control unit 31B decides the light emission intensity "Q3" of the auxiliary light in the light emission period FL3 such that the light intensity "Q3a" is equal to "0.88×Q1". In the example in FIG. 9, the light emission intensity "Q3" is set as "0.93×Q1".

By the setting operation of the imaging condition illustrated in FIG. 7, the light emission intensity of the auxiliary light in the light emission period in each imaging period of the consecutive imaging is controlled.

As described thus far, by setting the light emission intensity of the auxiliary light in each of the light emission periods FL1, FL2, and FL3, the light intensity of the auxiliary light received by the imaging element 12 is equal to the target value in any of the imaging periods TS1, TS2, and TS3. Thus, even in a case where the subject is consecutively imaged at a high speed in a short time, the brightness of the captured image obtained in each imaging can be appropriately set.

In step S6 illustrated in FIG. 7, the imaging condition control unit 31B of the electronic apparatus 30 may set the appropriate brightness of the captured image by adjusting the imaging sensitivity included in the second setting information and the third setting information instead of adjusting the light emission intensity of the auxiliary light included in the second setting information and the third setting information.

Figure 10:
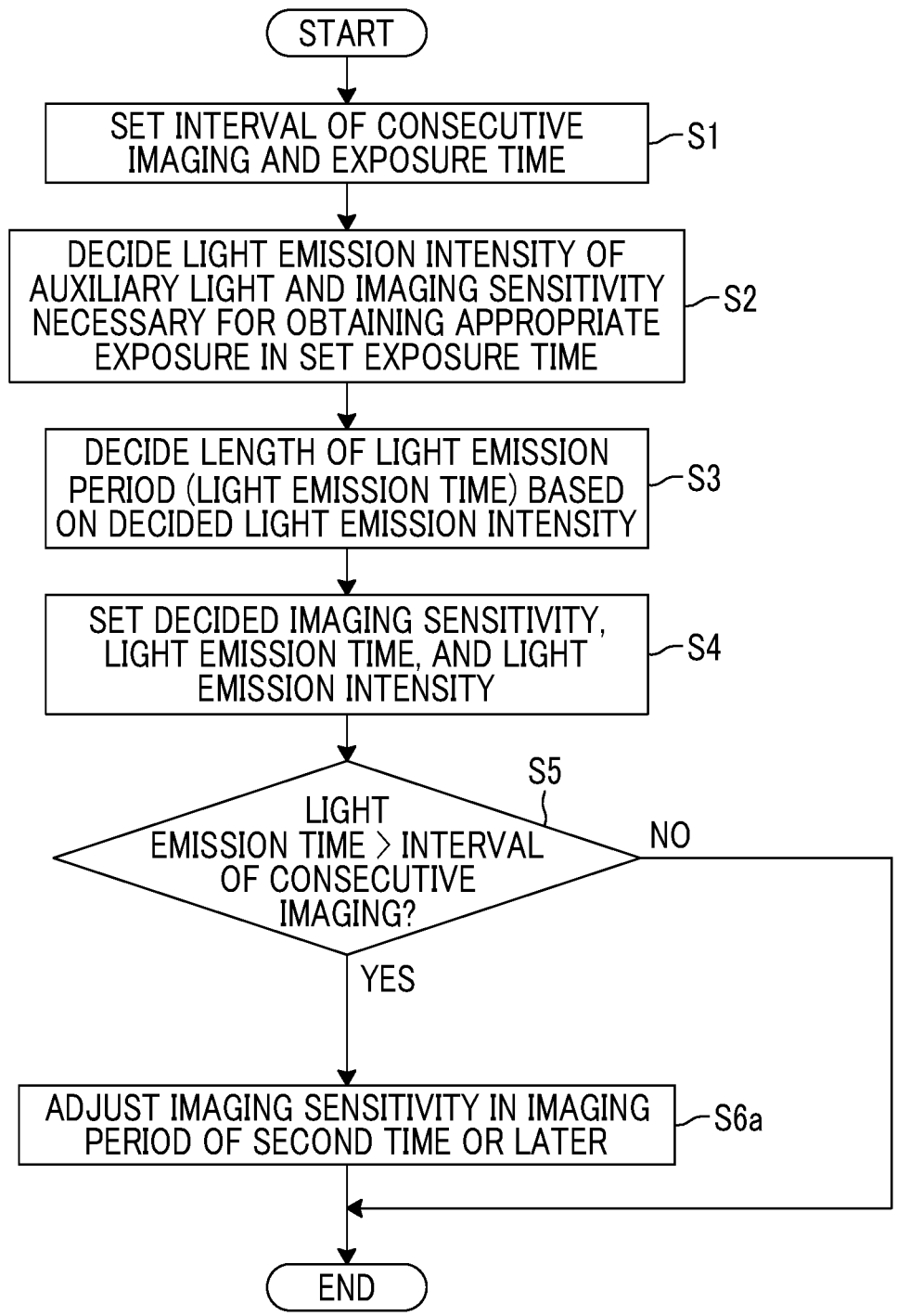
FIG. 10 is a flowchart for describing a modification example of the setting operation of the imaging condition performed by the imaging condition control unit 31B illustrated in FIG. 6.

FIG. 10 is a flowchart for describing a modification example of the setting operation of the imaging condition performed by the imaging condition control unit 31B illustrated in FIG. 6.

FIG. 10 is the same as the flowchart illustrated in FIG. 7 except that step S6 is changed to step S6a. In FIG. 10, the same processes as FIG. 7 are designated by the same reference signs, and descriptions of such processes will not be repeated.

In a case where a YES determination is made in step S5, the imaging condition control unit 31B adjusts each of the imaging sensitivity in the imaging period TS2 (information of the imaging sensitivity in the second setting information) and the imaging sensitivity in the imaging period TS3 (information of the imaging sensitivity in the third setting information) illustrated in FIG. 8 based on the light emission intensity of the auxiliary light emitted in the overlapping period (step S6a), and ends the setting operation.

FIG. 11 is a diagram for describing one example of a method of adjusting imaging sensitivity in step S6a illustrated in FIG. 10.

The imaging condition control unit 31B sets a target value to be a light intensity that is a part of the light emission intensity of the auxiliary light in the light emission period FL1 started in the initial imaging period TS1 of the three imaging periods illustrated in FIG. 8 and is received by the imaging element 12 of the imaging apparatus 10A in the imaging period TS1.

For example, as illustrated in FIG. 11, the light emission intensity of the auxiliary light emitted in the light emission period FL1 is denoted by "Q1", and it is assumed that appropriate exposure is obtained in the imaging period TS1 by causing the imaging element 12 of the imaging apparatus 10A to receive 90% of the light emission intensity in the imaging period TS1. In this example, the target value is "0.9×Q1".

In this example, as illustrated in FIG. 11, 10% of the light emission intensity "Q1" ("0.1×Q1") of the auxiliary light in the light emission period FL1 is the light emission intensity of the auxiliary light emitted in the overlapping period with the imaging period TS2.

In the operation example of the setting operation of the imaging condition illustrated in FIG. 10, the light emission intensity in each light emission period is the same. Thus, the light emission intensity of the auxiliary light in the light emission period FL2 started in the imaging period TS2 is "Q1", and the light intensity that is a part of the light emission intensity "Q1" and is received by the imaging element 12 in the imaging period TS2 is equal to the target value "0.9×Q1".

In addition, 10% of the light emission intensity "Q1" ("0.1×Q1") of the auxiliary light in the light emission period FL2 is the light emission intensity of the auxiliary light emitted in the overlapping period with the imaging period TS3.

Similarly, the light emission intensity of the auxiliary light in the light emission period FL3 started in the imaging period TS3 is also "Q1", and the light intensity of the light emission intensity "Q1" received by the imaging element 12 in the imaging period TS3 is equal to the target value "0.9×Q1".

The imaging condition control unit 31B obtains a ratio (=0.9) of the target value to the total value of the light intensity "0.9×Q1" that is a part of the light emission intensity "Q1" of the auxiliary light in the light emission period FL2 started in the imaging period TS2 and is received by the imaging element 12 of the imaging apparatus 10B in the imaging period TS2, and the light intensity "0.1×Q1" of the auxiliary light emitted in the overlapping period with the imaging period TS2 in the light emission period FL1 started in the imaging period TS1. The imaging condition control unit 31B sets a value obtained by multiplying a set value of the imaging sensitivity set in the imaging period TS1 by the ratio as the imaging sensitivity in the imaging period TS2.

Similarly, the imaging condition control unit 31B obtains a ratio (=0.9) of the target value to the total value of the light intensity "0.9×Q1" that is a part of the light emission intensity "Q1" of the auxiliary light in the light emission period FL3 started in the imaging period TS3 and is received by the imaging element 12 of the imaging apparatus 10C in the imaging period TS3, and the light intensity "0.1×Q1" of the auxiliary light emitted in the overlapping period with the imaging period TS3 in the light emission period FL2 started in the imaging period TS2. The imaging condition control unit 31B sets a value obtained by multiplying the set value of the imaging sensitivity set in the imaging period TS1 by the ratio as the imaging sensitivity in the imaging period TS3.

By such adjustment, in the imaging period TS2 and the imaging period TS3, the imaging element 12 receives a higher light emission intensity of "0.1×Q1" than in the imaging period TS1. However, the imaging sensitivity is set to 0.9 times the imaging sensitivity in the imaging period TS1 in correspondence with the received high light emission intensity. Thus, the brightness of the captured image obtained by imaging in each of the imaging periods TS1, TS2, and TS3 can be evenly set.

Figure 12:
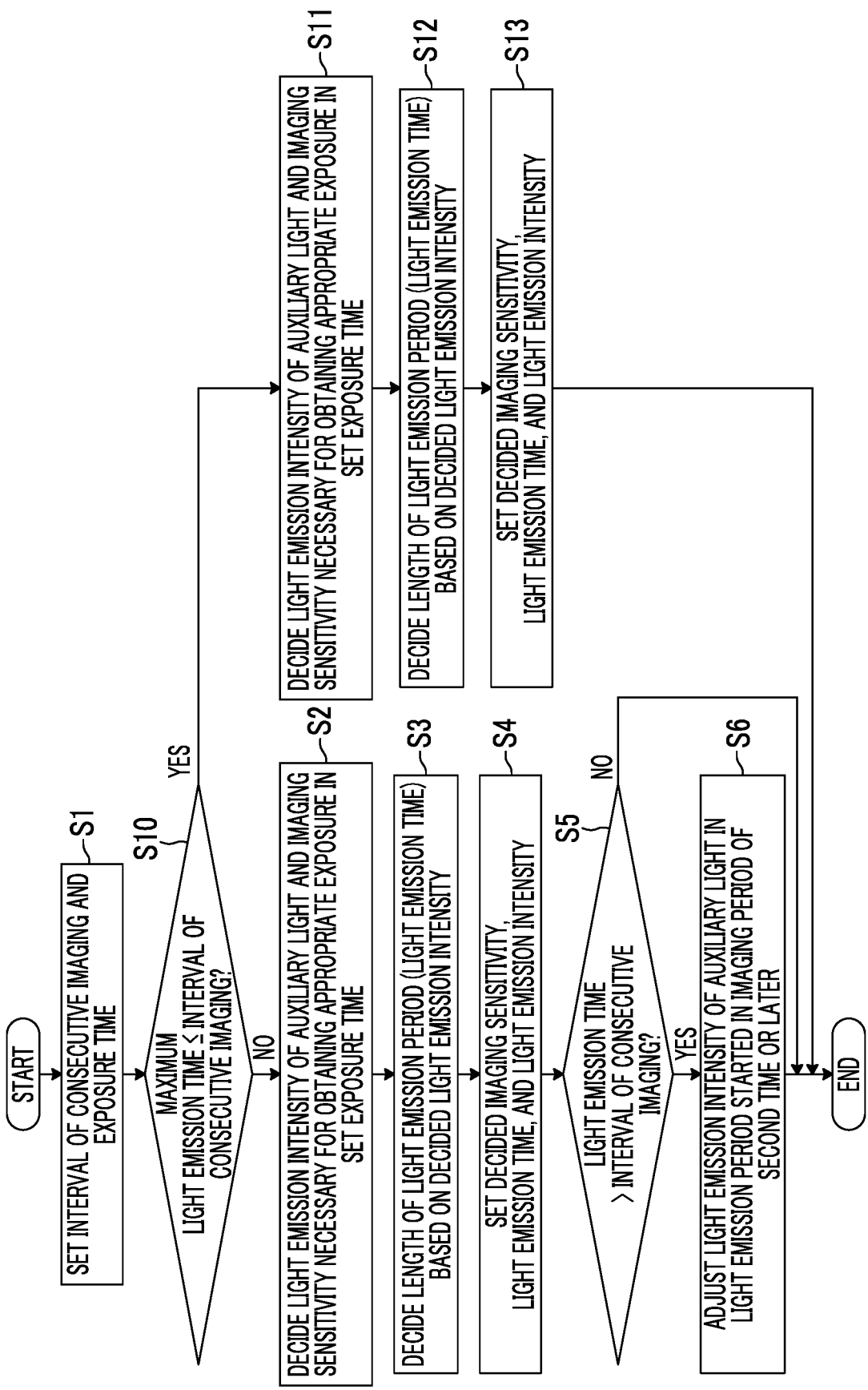
FIG. 12 is a flowchart for describing a modification example of the setting operation of the imaging condition performed by the imaging condition control unit 31B illustrated in FIG. 6.

FIG. 12 is a flowchart for describing a modification example of the setting operation of the imaging condition performed by the imaging condition control unit 31B illustrated in FIG. 6.

FIG. 12 is the same as the flowchart illustrated in FIG. 7 except that step S10 is added between step S1 and step S2 and step S1l to step S13 are further added. In FIG. 12, the same processes as FIG. 7 are designated by the same reference signs, and descriptions of such processes will not be repeated.

After step S1, the imaging condition control unit 31B acquires information of the maximum light emission time in which the auxiliary light can be emitted by the light emission device 20A from the system control unit 18A of the imaging apparatus 10A, and determines whether or not the interval of the consecutive imaging set in step S1 is greater than or equal to the maximum light emission time (step S10).

Since the light emission device 20A, the light emission device 20B, and the light emission device 20C have the same configuration, information of the maximum light emission time may be acquired from the system control unit 18B or the system control unit 18C.

In a case where a NO determination is made in step S10, the overlapping period may occur, and the process of step S6 may be necessary. Thus, the imaging condition control unit 31B performs the processes from step S2.

In a case where a YES determination is made in step S10, the overlapping period does not occur. Thus, the imaging condition control unit 31B performs the processes from step S11.

The content of step S11 is the same as the process of step S2. The content of step S12 is the same as the process of step S3. The content of step S13 is the same as the process of step S4.

By the processes of step S11 to step S13, information of the light emission intensity set in the first setting information, the second setting information, and the third setting information is set to be the same. Accordingly, in the consecutive imaging performed based on the first setting information, the second setting information, and the third setting information, the light emission intensity of the auxiliary light in each light emission period is controlled to be the same.

As described thus far, according to the setting operation of the imaging condition illustrated in FIG. 12, only the processes of step S11 to step S13 are performed in a case where the processes of step S5 and step S6 need to be performed. Thus, a processing amount of the control unit 31 can be reduced, and power consumption can be reduced.

Figure 13:
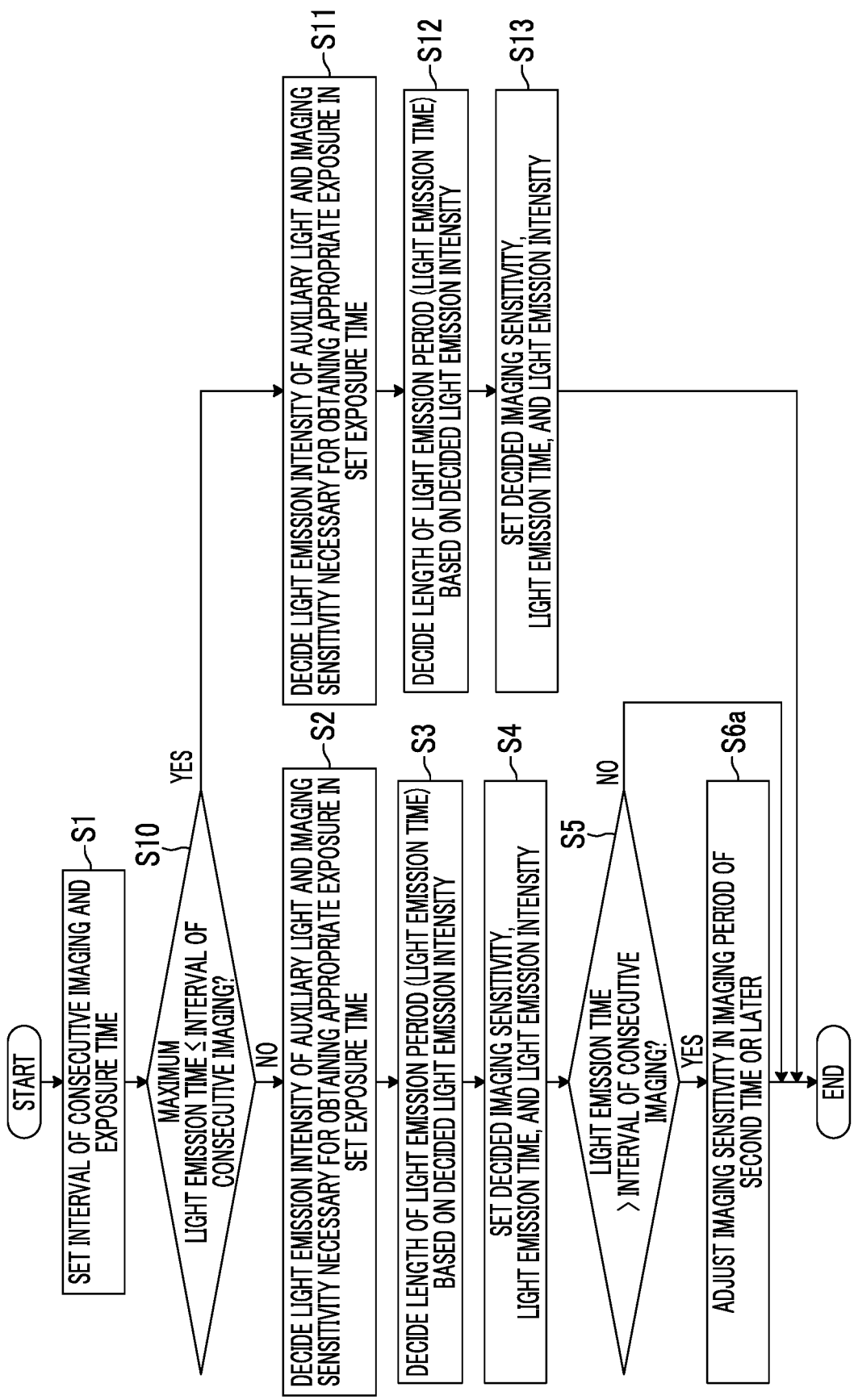
FIG. 13 is a flowchart for describing a modification example of the setting operation of the imaging condition performed by the imaging condition control unit 31B illustrated in FIG. 6.

FIG. 13 is a flowchart for describing a modification example of the setting operation of the imaging condition performed by the imaging condition control unit 31B illustrated in FIG. 6.

FIG. 13 is the same as the flowchart illustrated in FIG. 12 except that step S6 is changed to step S6a. In FIG. 13, the same processes as FIG. 12 are designated by the same reference signs, and descriptions of such processes will not be repeated.

In a case where a NO determination is made in step S10, the process of step S6a may be necessary. Thus, the imaging condition control unit 31B performs the processes from step S2.

In a case where a YES determination is made in step S10, the overlapping period does not occur. Thus, the imaging condition control unit 31B performs the processes from step S11.

By the processes of step S11 to step S13, information of the imaging sensitivity set in the first setting information, the second setting information, and the third setting information is set to be the same. Accordingly, in the consecutive imaging performed based on the first setting information, the second setting information, and the third setting information, the imaging sensitivity in each imaging period is controlled to be the same.

As described thus far, according to the setting operation of the imaging condition illustrated in FIG. 13, only the processes of step S11 to step S13 are performed in a case where the processes of step S5 and step S6a need to be performed. Thus, the processing amount of the control unit 31 can be reduced, and power consumption can be reduced.

In the description thus far, in a case where the overlapping period occurs (in a case where the light emission time is longer than the interval of the imaging period), the light emission intensity or the imaging sensitivity included in the first setting information, the second setting information, and the third setting information is adjusted by the imaging condition control unit 31B. Alternatively, a manual mode in which the adjustment is not performed may be set to be selectable in the electronic apparatus 30.

Figure 14:
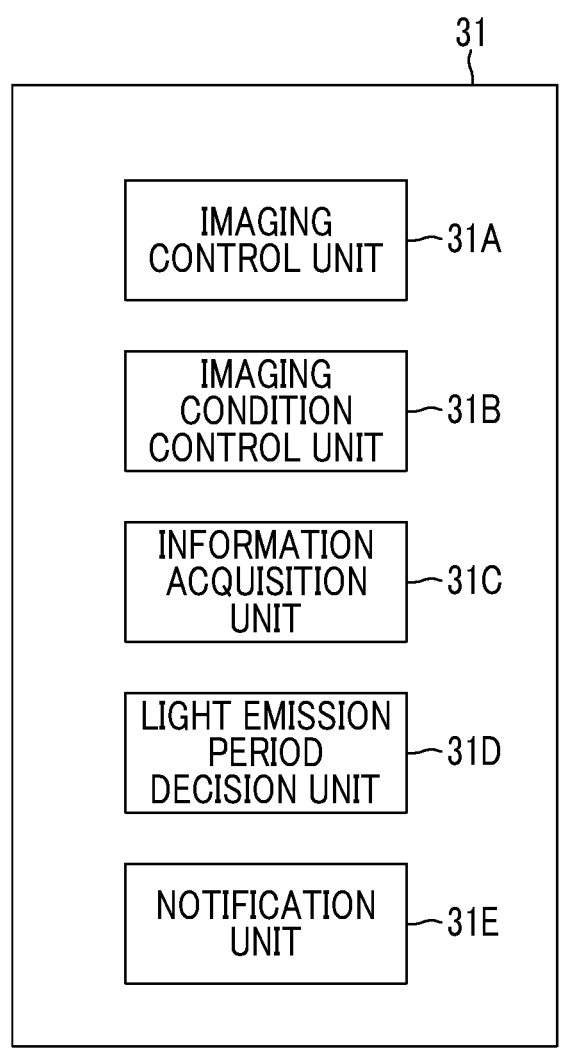
FIG. 14 is a diagram illustrating function blocks of the control unit 31 illustrated in FIG. 6 at a time of a manual mode.

FIG. 14 is a diagram illustrating function blocks of the control unit 31 illustrated in FIG. 6 at the time of the manual mode. In FIG. 14, the same configurations as FIG. 6 are designated by the same reference signs, and descriptions of such configurations will not be repeated.

As illustrated in FIG. 14, by executing the programs stored in the ROM of the memory 33 including the imaging control program, the control unit 31 functions as an imaging control device that comprises the imaging control unit 31A, the imaging condition control unit 31B, an information acquisition unit 31C, a light emission period decision unit 31D, and a notification unit 31E.

In a case where information of the interval of the consecutive imaging and information of the length of each imaging period (exposure time) at the time of the consecutive imaging are input from the operation unit 32, the information acquisition unit 31C acquires the information.

The light emission period decision unit 31D decides the light emission intensity of the auxiliary light and the imaging sensitivity in each imaging period of the consecutive imaging necessary for obtaining appropriate exposure in the exposure time acquired by the information acquisition unit 31C. Based on the decided light emission intensity, the light emission period decision unit 31D decides the length of the light emission period (light emission time) of the auxiliary light necessary for obtaining the light emission intensity.

In the manual mode, the imaging condition control unit 31B sets the interval of the consecutive imaging acquired by the information acquisition unit 31C as the imaging condition. Furthermore, the imaging condition control unit 31B sets the exposure time acquired by the information acquisition unit 31C and the light emission intensity, the light emission time, and the imaging sensitivity decided by the light emission period decision unit 31D as the exposure time, the light emission intensity, the light emission time, and the imaging sensitivity included in each of the first setting information, the second setting information, and the third setting information.

That is, in the manual mode, the imaging control unit 31A causes the imaging apparatuses 10A, 10B, and 10C to consecutively perform the imaging based on the interval of the consecutive imaging acquired by the information acquisition unit 31C, the exposure time acquired by the information acquisition unit 31C, and the light emission intensity, the light emission time, and the imaging sensitivity decided by the light emission period decision unit 31D.

The notification unit 31E obtains the start timing of the imaging period of the second time or later among the imaging periods of the consecutive imaging based on information of the interval of the consecutive imaging and information of the length of the imaging period acquired by the information acquisition unit 31C. In a case where the start timing of the imaging period of the second time or later is earlier than the end timing of the light emission period started in the imaging period immediately before the imaging period of the second time or later (in a case where the overlapping period occurs), the notification unit 31E performs notification of the occurrence of the overlapping period using an output device such as a speaker or a display device mounted in the electronic apparatus 30.

In the manual mode, the adjustment of the light emission intensity or the imaging sensitivity by the imaging condition control unit 31B is not performed. Thus, by causing the notification unit 31E to perform the notification of the occurrence of the overlapping period, the user can recognize that a change in brightness may occur in the captured image obtained by the consecutive imaging based on the input interval and exposure time.

Accordingly, by adjusting one or both of the interval of the consecutive imaging and the exposure time, the user receiving the notification can perform the consecutive imaging in a state where the overlapping period is removed, and can appropriately set the brightness of the captured image even in the manual mode.

The control unit 31 of the electronic apparatus 30 sets the imaging condition and controls each of the imaging apparatuses 10A, 10B, and 10C to perform the consecutive imaging. However, the control unit 31 is not for limitation purposes. For example, the imaging system 100 can be modified to a configuration illustrated in FIG. 15 or FIG. 16.

Figure 15:
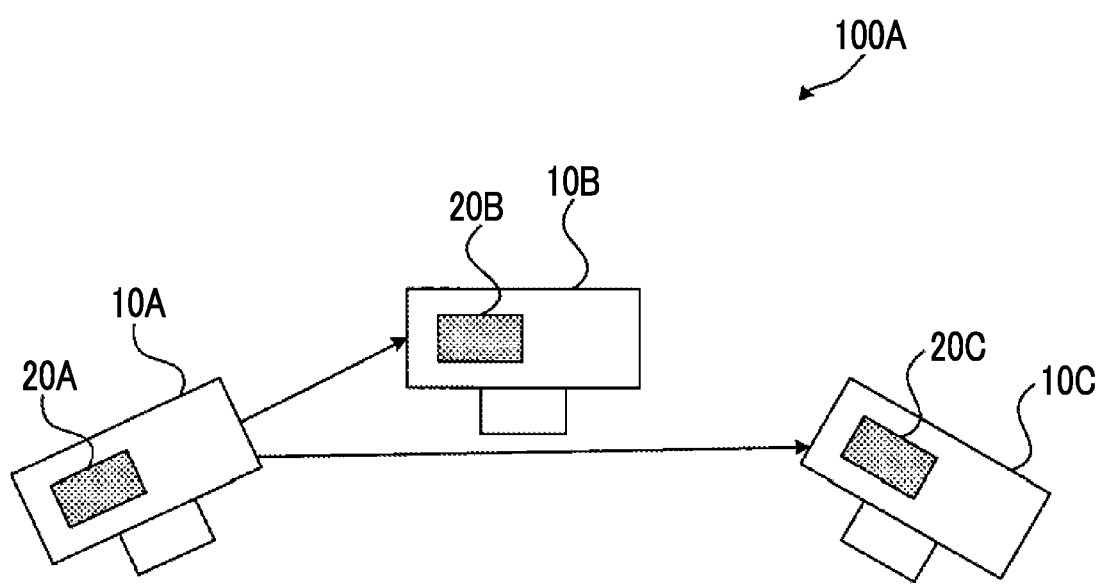
FIG. 15 is a diagram illustrating a configuration of an imaging system 100A that is a modification example of the imaging system 100 illustrated in FIG. 1.

FIG. 15 is a diagram illustrating a configuration of an imaging system 100A that is a modification example of the imaging system 100 illustrated in FIG. 1.

The imaging system 100A comprises the imaging apparatus 10A, the imaging apparatus 10B, and the imaging apparatus 10C. The imaging apparatus 10A is configured to be capable of controlling the imaging apparatus 10B and the imaging apparatus 10C.

In the imaging system 100A, the system control unit 18A of the imaging apparatus 10A has the same function as the control unit 31 of the electronic apparatus 30. That is, the system control unit 18A functions as the imaging control device.

The system control unit 18A of the imaging apparatus 10A generates the first setting information, the second setting information, and the third setting information and controls the imaging apparatus 10A, the imaging apparatus 10B, and the imaging apparatus 10C to perform the consecutive imaging of the subject H based on the information.

According to the imaging system 100A, the electronic apparatus 30 is not necessary. Thus, a cost necessary for system construction can be reduced.

Figure 16:
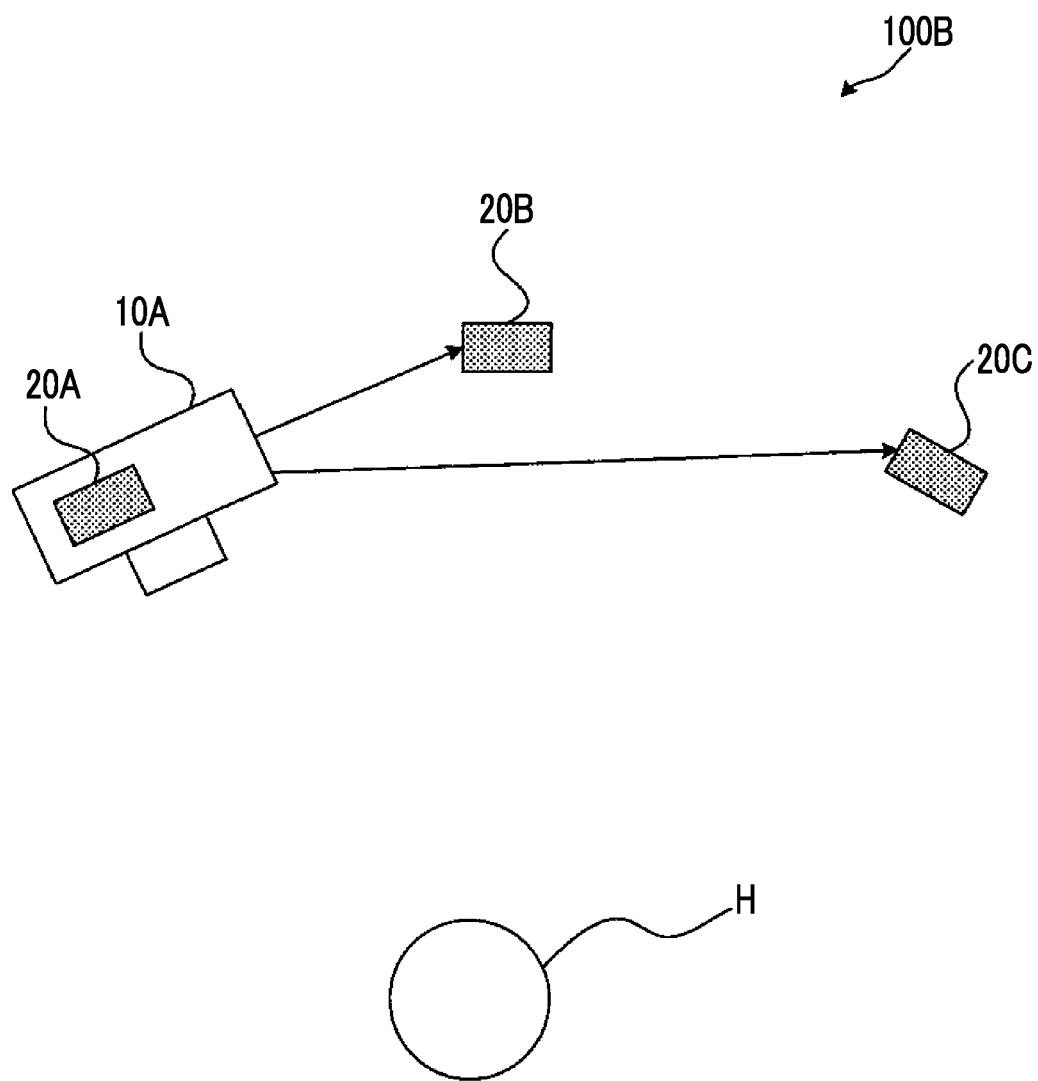
FIG. 16 is a diagram illustrating a configuration of an imaging system 100B that is a modification example of the imaging system 100 illustrated in FIG. 1.

FIG. 16 is a diagram illustrating a configuration of an imaging system 100B that is a modification example of the imaging system 100 illustrated in FIG. 1.

The imaging system 100B comprises the imaging apparatus 10A, the light emission device 20B, and the light emission device 20C. The system control unit 18A of the imaging apparatus 10A is configured to be capable of controlling the light emission device 20A of the imaging apparatus 10A, the light emission device 20B, and the light emission device 20C.

In the imaging system 100B, the system control unit 18A of the imaging apparatus 10A has the same function as the control unit 31 of the electronic apparatus 30. The system control unit 18A of the imaging apparatus 10A generates the first setting information, the second setting information, and the third setting information and consecutively images the subject H three times by the imaging element 12 of the imaging apparatus 10A based on the information. In the imaging periods in which the imaging is performed three times, the system control unit 18A controls the light emission device 20B and the light emission device 20C to emit the auxiliary light.

According to the imaging system 100B, the electronic apparatus 30, the imaging apparatus 10B, and the imaging apparatus 10C are not necessary. Thus, the cost necessary for the system construction can be reduced.

While a case where the imaging system 100 illustrated in FIG. 1 and the imaging system 100A illustrated in FIG. 15 consecutively image the subject H three times is illustrated, the number of times of the consecutive imaging may be two or four or more. In that case, the number of imaging apparatuses in which the light emission devices are mounted may be two or four or more.

Similarly, in the imaging system 100B illustrated in FIG. 16, in a case where the subject H is consecutively imaged two times or four times or more, the number of external light emission devices that can communicate with the imaging apparatus 10A may be one or three or more.

According to the embodiment of the present invention, an imaging control device capable of appropriately setting brightness of a captured image obtained in each imaging even in a case where a subject is consecutively imaged at a high speed in a short time, an imaging apparatus including the imaging control apparatus, an imaging control method, and an imaging control program can be provided.

As described thus far, the following matters are disclosed in the present specification.

(1) An imaging control device comprising an imaging control unit that performs consecutive imaging control for consecutively imaging a subject a plurality of times by an imaging element and emitting auxiliary light from a light emission device in an imaging period in which each of the plurality of times of the imaging is performed, in which the imaging periods of the plurality of times do not overlap, an end timing of a light emission period of the auxiliary light started in the imaging period is later than an end timing of the imaging period, the imaging period that precedes between the two imaging periods adjacent in time series is set as a first imaging period, and the imaging period that succeeds between the two imaging periods is set as a second imaging period, and the imaging control device further includes an imaging condition control unit that controls a light emission intensity of the auxiliary light in the light emission period started in the second imaging period or imaging sensitivity in the second imaging period based on the light emission intensity of the auxiliary light emitted in an overlapping period overlapping with the second imaging period in the light emission period started in the first imaging period.

(2) The imaging control device according to (1), in which a light intensity that is a part of the light emission intensity of the auxiliary light in the light emission period started in an initial imaging period among the plurality of times of the imaging periods and is received by the imaging element in the initial imaging period is set as a target value, and the imaging condition control unit controls the light emission intensity of the auxiliary light in the light emission period started in the second imaging period to be equal to a value satisfying a condition that a total value of a light intensity that is a part of the light emission intensity and is received by the imaging element in the second imaging period, and a light intensity of the auxiliary light emitted in the overlapping period in the light emission period started in the first imaging period matches the target value.

(3) The imaging control device according to (1), in which a light intensity that is a part of the light emission intensity of the auxiliary light in the light emission period started in an initial imaging period among the plurality of times of the imaging periods and is received by the imaging element in the initial imaging period is set as a target value, and as the imaging sensitivity in the second imaging period, the imaging condition control unit sets a value obtained by multiplying the imaging sensitivity in the first imaging period by a ratio of the target value to a total value of a light intensity that is a part of the light emission intensity of the auxiliary light in the light emission period started in the second imaging period and is received by the imaging element in the second imaging period, and a light intensity of the auxiliary light emitted in the overlapping period in the light emission period started in the initial imaging period.

(4) The imaging control device according to any one of (1) to (3), in which the imaging condition control unit obtains the overlapping period based on a length of the imaging period and an interval of the imaging periods of the plurality of times.

(5) The imaging control device according to any one of (1) to (4), in which the imaging condition control unit acquires information of a maximum time in which the auxiliary light is allowed to be emitted by the light emission device, and controls each of the light emission intensity of the auxiliary light emitted in each of the imaging periods of the plurality of times and the imaging sensitivity of each of the plurality of times of the imaging to be equal to a constant value in a case where an interval of the imaging period is greater than or equal to the maximum time.

(6) The imaging control device according to any one of (1) to (5), further comprising an information acquisition unit that acquires information of an interval of the imaging period and information of a length of the imaging period input from an operation unit, a light emission period decision unit that decides the length of the light emission period started in each of the imaging periods of the plurality of times based on the information of the length of the imaging period, and a notification unit that obtains a start timing of the imaging period of the second time or later among the plurality of times of the imaging periods based on the information of the interval of the imaging period and the information of the length of the imaging period, and performs notification in a case where the start timing of the imaging period of the second time or later is earlier than an end timing of the light emission period started in the imaging period immediately before the imaging period of the second time or later, in which the imaging control unit has a mode in which the consecutive imaging control is performed based on the information of the interval of the imaging period, the information of the length of the imaging period, and the length of the light emission period.

(7) An imaging apparatus comprising the imaging control device according to any one of (1) to (6).

(8) An imaging control method comprising an imaging control step of performing consecutive imaging control for consecutively imaging a subject a plurality of times by an imaging element and emitting auxiliary light from a light emission device in an imaging period in which each of the plurality of times of the imaging is performed, in which the imaging periods of the plurality of times do not overlap, an end timing of a light emission period of the auxiliary light started in the imaging period is later than an end timing of the imaging period, the imaging period that precedes between the two imaging periods adjacent in time series is set as a first imaging period, and the imaging period that succeeds between the two imaging periods is set as a second imaging period, and the imaging control method further includes an imaging condition control step of controlling a light emission intensity of the auxiliary light in the light emission period started in the second imaging period or imaging sensitivity in the second imaging period based on the light emission intensity of the auxiliary light emitted in an overlapping period overlapping with the second imaging period in the light emission period started in the first imaging period.

(9) The imaging control method according to (8), in which a light intensity that is a part of the light emission intensity of the auxiliary light in the light emission period started in an initial imaging period among the plurality of times of the imaging periods and is received by the imaging element in the first imaging period is set as a target value, and in the imaging condition control step, the light emission intensity of the auxiliary light in the light emission period started in the second imaging period is controlled to be equal to a value satisfying a condition that a total value of a light intensity that is a part of the light emission intensity and is received by the imaging element in the second imaging period, and a light intensity of the auxiliary light emitted in the overlapping period in the light emission period started in the first imaging period matches the target value.

(10) The imaging control method according to (8), in which a light intensity that is a part of the light emission intensity of the auxiliary light in the light emission period started in an initial imaging period among the plurality of times of the imaging periods and is received by the imaging element in the initial imaging period is set as a target value, and in the imaging condition control step, a value obtained by multiplying the imaging sensitivity in the first imaging period by a ratio of the target value to a total value of a light intensity that is a part of the light emission intensity of the auxiliary light in the light emission period started in the second imaging period and is received by the imaging element in the second imaging period, and a light intensity of the auxiliary light emitted in the overlapping period in the light emission period started in the initial imaging period is set as the imaging sensitivity in the second imaging period.

(11) The imaging control method according to any one of (8) to (10), in which in the imaging condition control step, the overlapping period is obtained based on a length of the imaging period and an interval of the imaging periods of the plurality of times.

(12) The imaging control method according to any one of (8) to (11), in which in the imaging condition control step, information of a maximum time in which the auxiliary light is allowed to be emitted by the light emission device is acquired, and each of the light emission intensity of the auxiliary light emitted in each of the imaging periods of the plurality of times and the imaging sensitivity of each of the plurality of times of the imaging is controlled to be equal to a constant value in a case where an interval of the imaging period is greater than or equal to the maximum time.

(13) The imaging control method according to any one of (8) to (12), further comprising an information acquisition step of acquiring information of an interval of the imaging period and information of a length of the imaging period input from an operation unit, a light emission period decision step of deciding the length of the light emission period started in each of the imaging periods of the plurality of times based on the information of the length of the imaging period, a step of performing the consecutive imaging control based on the information of the interval of the imaging period, the information of the length of the imaging period, and the length of the light emission period, and a notification step of obtaining a start timing of the imaging period of the second time or later among the plurality of times of the imaging periods based on the information of the interval of the imaging period and the information of the length of the imaging period, and performing notification in a case where the start timing of the imaging period of the second time or later is earlier than an end timing of the light emission period started in the imaging period immediately before the imaging period of the second time or later.

(14) An imaging control program causing a computer to execute an imaging control step and an imaging condition control step, in which the imaging control step is a step of performing consecutive imaging control for consecutively imaging a subject a plurality of times by an imaging element and emitting auxiliary light from a light emission device in an imaging period in which each of the plurality of times of the imaging is performed, the imaging periods of the plurality of times do not overlap, an end timing of a light emission period of the auxiliary light started in the imaging period is later than an end timing of the imaging period, the imaging period that precedes between the two imaging periods adjacent in time series is set as a first imaging period, and the imaging period that succeeds between the two imaging periods is set as a second imaging period, and the imaging condition control step is a step of controlling a light emission intensity of the auxiliary light in the light emission period started in the second imaging period or imaging sensitivity in the second imaging period based on the light emission intensity of the auxiliary light emitted in an overlapping period overlapping with the second imaging period in the light emission period started in the first imaging period.

EXPLANATION OF REFERENCES 100, 100A, 100B: imaging system
10A, 10B, 10C: imaging apparatus
20A, 20B, 20C: light emission device
30: electronic apparatus
H: subject
11: imaging optical system
12: imaging element
13: drive unit
14: analog front end
15: communication interface
16: image processing unit
18A, 18B, 18C: system control unit
31: control unit
31A: imaging control unit
31B: imaging condition control unit
31C: information acquisition unit
31D: light emission period decision unit
31E: notification unit
32: operation unit
33: memory
34: communication interface
TS1, TS2, TS3: imaging period
FL1, FL2, FL3: light emission period

What is claimed is:

1. An imaging control device comprising:
a processor configured to perform consecutive imaging control for consecutively imaging a subject a plurality of times by an imaging sensor and emitting auxiliary light from a light emission device in an imaging period in which each of the plurality of times of the imaging is performed,
wherein the imaging periods of the plurality of times do not overlap,
an end timing of a light emission period of the auxiliary light started in the imaging period is later than an end timing of the imaging period,
the imaging period that precedes between the two imaging periods adjacent in time series is set as a first imaging period, and the imaging period that succeeds between the two imaging periods is set as a second imaging period, and
the processor further controls a light emission intensity of the auxiliary light in the light emission period started in the second imaging period or imaging sensitivity in the second imaging period based on the light emission intensity of the auxiliary light emitted in an overlapping period overlapping with the second imaging period in the light emission period started in the first imaging period.

2. The imaging control device according to claim 1, wherein a light intensity that is a part of the light emission intensity of the auxiliary light in the light emission period started in an initial imaging period among the plurality of times of the imaging periods and is received by the imaging sensor in the initial imaging period is set as a target value, and
the processor controls the light emission intensity of the auxiliary light in the light emission period started in the second imaging period to be equal to a value satisfying a condition that a total value of a light intensity that is a part of the light emission intensity and is received by the imaging sensor in the second imaging period, and a light intensity of the auxiliary light emitted in the overlapping period in the light emission period started in the first imaging period matches the target value.

3. The imaging control device according to claim 1, wherein a light intensity that is a part of the light emission intensity of the auxiliary light in the light emission period started in an initial imaging period among the plurality of times of the imaging periods and is received by the imaging sensor in the initial imaging period is set as a target value, and
as the imaging sensitivity in the second imaging period, the processor sets a value obtained by multiplying the imaging sensitivity in the first imaging period by a ratio of the target value to a total value of a light intensity that is a part of the light emission intensity of the auxiliary light in the light emission period started in the second imaging period and is received by the imaging sensor in the second imaging period, and a light intensity of the auxiliary light emitted in the overlapping period in the light emission period started in the initial imaging period.

4. The imaging control device according to claim 1, wherein the processor obtains the overlapping period based on a length of the imaging period and an interval of the imaging periods of the plurality of times.

5. The imaging control device according to claim 2, wherein the processor obtains the overlapping period based on a length of the imaging period and an interval of the imaging periods of the plurality of times.

6. The imaging control device according to claim 3, wherein the processor obtains the overlapping period based on a length of the imaging period and an interval of the imaging periods of the plurality of times.

7. The imaging control device according to claim 1, wherein the processor acquires information of a maximum time in which the auxiliary light is allowed to be emitted by the light emission device, and controls each of the light emission intensity of the auxiliary light emitted in each of the imaging periods of the plurality of times and the imaging sensitivity of each of the plurality of times of the imaging to be equal to a constant value in a case where an interval of the imaging period is greater than or equal to the maximum time.

8. The imaging control device according to claim 2, wherein the processor acquires information of a maximum time in which the auxiliary light is allowed to be emitted by the light emission device, and controls each of the light emission intensity of the auxiliary light emitted in each of the imaging periods of the plurality of times and the imaging sensitivity of each of the plurality of times of the imaging to be equal to a constant value in a case where an interval of the imaging period is greater than or equal to the maximum time.

9. The imaging control device according to claim 3, wherein the processor acquires information of a maximum time in which the auxiliary light is allowed to be emitted by the light emission device, and controls each of the light emission intensity of the auxiliary light emitted in each of the imaging periods of the plurality of times and the imaging sensitivity of each of the plurality of times of the imaging to be equal to a constant value in a case where an interval of the imaging period is greater than or equal to the maximum time.

10. The imaging control device according to claim 1, further comprising:
an information acquisition unit that acquires information of an interval of the imaging period and information of a length of the imaging period input from an operation unit;
a light emission period decision unit that decides the length of the light emission period started in each of the imaging periods of the plurality of times based on the information of the length of the imaging period; and
a notification unit that obtains a start timing of the imaging period of the second time or later among the plurality of times of the imaging periods based on the information of the interval of the imaging period and the information of the length of the imaging period, and performs notification in a case where the start timing of the imaging period of the second time or later is earlier than an end timing of the light emission period started in the imaging period immediately before the imaging period of the second time or later,
wherein the processor has a mode in which the consecutive imaging control is performed based on the information of the interval of the imaging period, the information of the length of the imaging period, and the length of the light emission period.

11. The imaging control device according to claim 2, further comprising:
an information acquisition unit that acquires information of an interval of the imaging period and information of a length of the imaging period input from an operation unit;
a light emission period decision unit that decides the length of the light emission period started in each of the imaging periods of the plurality of times based on the information of the length of the imaging period; and
a notification unit that obtains a start timing of the imaging period of the second time or later among the plurality of times of the imaging periods based on the information of the interval of the imaging period and the information of the length of the imaging period, and performs notification in a case where the start timing of the imaging period of the second time or later is earlier than an end timing of the light emission period started in the imaging period immediately before the imaging period of the second time or later,
wherein the processor has a mode in which the consecutive imaging control is performed based on the information of the interval of the imaging period, the information of the length of the imaging period, and the length of the light emission period.

12. An imaging apparatus comprising:
the imaging control device according to claim 1.

13. An imaging apparatus comprising:
the imaging control device according to claim 2.

14. An imaging control method comprising:
an imaging control step of performing consecutive imaging control for consecutively imaging a subject a plurality of times by an imaging sensor and emitting auxiliary light from a light emission device in an imaging period in which each of the plurality of times of the imaging is performed,
wherein the imaging periods of the plurality of times do not overlap,
an end timing of a light emission period of the auxiliary light started in the imaging period is later than an end timing of the imaging period,
the imaging period that precedes between the two imaging periods adjacent in time series is set as a first imaging period, and the imaging period that succeeds between the two imaging periods is set as a second imaging period, and
the imaging control method further includes an imaging condition control step of controlling a light emission intensity of the auxiliary light in the light emission period started in the second imaging period or imaging sensitivity in the second imaging period based on the light emission intensity of the auxiliary light emitted in an overlapping period overlapping with the second imaging period in the light emission period started in the first imaging period.

15. The imaging control method according to claim 14,
wherein a light intensity that is a part of the light emission intensity of the auxiliary light in the light emission period started in an initial imaging period among the plurality of times of the imaging periods and is received by the imaging sensor in the first imaging period is set as a target value, and
in the imaging condition control step, the light emission intensity of the auxiliary light in the light emission period started in the second imaging period is controlled to be equal to a value satisfying a condition that a total value of a light intensity that is a part of the light emission intensity and is received by the imaging sensor in the second imaging period, and a light intensity of the auxiliary light emitted in the overlapping period in the light emission period started in the first imaging period matches the target value.

16. The imaging control method according to claim 14,
wherein a light intensity that is a part of the light emission intensity of the auxiliary light in the light emission period started in an initial imaging period among the plurality of times of the imaging periods and is received by the imaging sensor in the initial imaging period is set as a target value, and
in the imaging condition control step, a value obtained by multiplying the imaging sensitivity in the first imaging period by a ratio of the target value to a total value of a light intensity that is a part of the light emission intensity of the auxiliary light in the light emission period started in the second imaging period and is received by the imaging sensor in the second imaging period, and a light intensity of the auxiliary light emitted in the overlapping period in the light emission period started in the initial imaging period is set as the imaging sensitivity in the second imaging period.

17. The imaging control method according to claim 14,
wherein in the imaging condition control step, the overlapping period is obtained based on a length of the imaging period and an interval of the imaging periods of the plurality of times.

18. The imaging control method according to claim 14,
wherein in the imaging condition control step, information of a maximum time in which the auxiliary light is allowed to be emitted by the light emission device is acquired, and each of the light emission intensity of the auxiliary light emitted in each of the imaging periods of the plurality of times and the imaging sensitivity of each of the plurality of times of the imaging is controlled to be equal to a constant value in a case where an interval of the imaging period is greater than or equal to the maximum time.

19. The imaging control method according to claim 14, further comprising:
- an information acquisition step of acquiring information of an interval of the imaging period and information of the length of the imaging period input from an operation unit;
- a light emission period decision step of deciding the length of the light emission period started in each of the imaging periods of the plurality of times based on the information of the length of the imaging period;
- a step of performing the consecutive imaging control based on the information of the interval of the imaging period, the information of the length of the imaging period, and the length of the light emission period; and
- a notification step of obtaining a start timing of the imaging period of the second time or later among the plurality of times of the imaging periods based on the information of the interval of the imaging period and the information of the length of the imaging period, and performing notification in a case where the start timing of the imaging period of the second time or later is earlier than an end timing of the light emission period started in the imaging period immediately before the imaging period of the second time or later.

20. A non-transitory computer recording medium storing an imaging control program causing a computer to execute an imaging control step and an imaging condition control step,
- wherein the imaging control step is a step of performing consecutive imaging control for consecutively imaging a subject a plurality of times by an imaging sensor and emitting auxiliary light from a light emission device in an imaging period in which each of the plurality of times of the imaging is performed,
- the imaging periods of the plurality of times do not overlap,
- an end timing of a light emission period of the auxiliary light started in the imaging period is later than an end timing of the imaging period,
- the imaging period that precedes between the two imaging periods adjacent in time series is set as a first imaging period, and the imaging period that succeeds between the two imaging periods is set as a second imaging period, and
- the imaging condition control step is a step of controlling a light emission intensity of the auxiliary light in the light emission period started in the second imaging period or imaging sensitivity in the second imaging period based on the light emission intensity of the auxiliary light emitted in an overlapping period overlapping with the second imaging period in the light emission period started in the first imaging period.

* * * * *